(12) United States Patent
Jin et al.

(10) Patent No.: US 10,877,187 B2
(45) Date of Patent: Dec. 29, 2020

(54) HYDROPHOBIC MIRROR AND VEHICLE USING THE SAME

(71) Applicants: Tsinghua University, Beijing (CN); HON HAI PRECISION INDUSTRY CO., LTD., New Taipei (TW)

(72) Inventors: Yuan-Hao Jin, Beijing (CN); Qun-Qing Li, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 211 days.

(21) Appl. No.: 16/221,982

(22) Filed: Dec. 17, 2018

(65) Prior Publication Data
US 2019/0212476 A1 Jul. 11, 2019

(30) Foreign Application Priority Data
Dec. 26, 2017 (CN) .......................... 2017 1 1435382

(51) Int. Cl.
*G02B 1/18* (2015.01)
*G02B 5/10* (2006.01)
(Continued)

(52) U.S. Cl.
CPC .................. *G02B 1/18* (2015.01); *B32B 3/30* (2013.01); *B32B 7/12* (2013.01);
(Continued)

(58) Field of Classification Search
CPC .. B32B 17/10; B32B 3/30; B32B 7/12; B32B 17/10018; B32B 17/10614;
(Continued)

(56) References Cited

U.S. PATENT DOCUMENTS 8,187,707 B2\* 5/2012 Van Benthem ...... C09D 5/1618
428/403
2004/0256311 A1 12/2004 Extrand
(Continued)

FOREIGN PATENT DOCUMENTS

CN 1031691 3/1989
CN 1031691 A 3/1989
(Continued)

OTHER PUBLICATIONS

"Super-hydrophobic Surface From Natural to Artificial", Jiang Lei et al., Modern Scientific Instruments, 2003, vol. 22:12, p. 1258-p. 1263;Dec. 30, 2003.

*Primary Examiner* — Bumsuk Won
*Assistant Examiner* — Balram T Parbadia
(74) *Attorney, Agent, or Firm* — ScienBiziP, P.C.

(57) ABSTRACT

The disclosure relates to a hydrophobic mirror. The hydrophobic mirror includes a support; a mirror body set in the support; and a hydrophobic film located on a surface of the mirror body. The hydrophobic film comprises a flexible substrate and a hydrophobic layer. The flexible substrate comprises a flexible base and a patterned first bulge layer located on a surface of the flexible base. The hydrophobic layer located on the surface of the patterned first bulge layer.

17 Claims, 25 Drawing Sheets

(51) Int. Cl.
*G02B 1/14* (2015.01)
*B32B 3/30* (2006.01)
*B32B 7/12* (2006.01)
*B32B 17/10* (2006.01)
*B60R 1/06* (2006.01)
*B60S 1/02* (2006.01)
*H05B 3/84* (2006.01)
*G02B 5/08* (2006.01)

(52) U.S. Cl.
CPC .. *B32B 17/10018* (2013.01); *B32B 17/10614* (2013.01); *B60R 1/06* (2013.01); *B60R 1/0602* (2013.01); *B60S 1/026* (2013.01); *G02B 1/14* (2015.01); *G02B 5/0808* (2013.01); *G02B 5/10* (2013.01); *H05B 3/845* (2013.01); *B32B 2264/10* (2013.01); *B32B 2307/416* (2013.01); *B32B 2307/73* (2013.01); *G02B 2207/101* (2013.01)

(58) Field of Classification Search
CPC .......... B32B 2264/10; B32B 2307/416; B32B 2307/73; B60R 1/06; B60R 1/00; B60R 1/0602; B60S 1/02; B60S 1/026; G02B 1/14; G02B 1/18; G02B 5/08; G02B 5/10; G02B 5/0808; G02B 2207/101; H05B 3/84; H05B 3/141; H05B 3/145; H05B 3/34; H05B 3/845; H05B 2214/04; H05B 2203/013; H05B 2214/03
See application file for complete search history.

(56) References Cited

U.S. PATENT DOCUMENTS

| | | | | |
|---|---|---|---|---|
| 2004/0264011 | A1* | 12/2004 | Lynam | B60R 1/08 359/866 |
| 2007/0231542 | A1* | 10/2007 | Deng | B08B 17/065 428/141 |
| 2007/0295714 | A1 | 12/2007 | Liu et al. | |
| 2008/0199659 | A1* | 8/2008 | Zhao | C03C 17/28 428/161 |
| 2009/0011222 | A1 | 1/2009 | Xiu et al. | |
| 2010/0112373 | A1* | 5/2010 | Coffey | B82Y 20/00 428/608 |
| 2010/0296187 | A1* | 11/2010 | Lynam | B60R 1/0602 359/864 |
| 2010/0330340 | A1* | 12/2010 | Rothstein | F15D 1/10 428/167 |
| 2012/0003427 | A1 | 1/2012 | Kuroda et al. | |
| 2012/0052241 | A1 | 3/2012 | King et al. | |
| 2012/0177881 | A1 | 7/2012 | Lee et al. | |
| 2013/0247506 | A1 | 9/2013 | Wiercinski et al. | |
| 2017/0297293 | A1 | 10/2017 | Kuroda et al. | |
| 2018/0112455 | A1* | 4/2018 | Vos | E06B 1/62 |
| 2018/0194619 | A1* | 7/2018 | Greer | B82B 1/005 |
| 2019/0212475 | A1 | 7/2019 | Jin et al. | |

FOREIGN PATENT DOCUMENTS

| | | |
|---|---|---|
| CN | 101090586 A | 12/2007 |
| CN | 101448591 | 6/2009 |
| CN | 102365164 | 2/2012 |
| CN | 102365164 A | 2/2012 |
| CN | 102387915 | 3/2012 |
| CN | 102387915 A | 3/2012 |
| CN | 101481590 | 7/2012 |
| CN | 102583214 A | 7/2012 |
| CN | 103359684 A | 10/2013 |
| CN | 105860870 A | 8/2016 |
| CN | 205596377 | 9/2016 |
| CN | 106276718 A | 1/2017 |
| CN | 106398332 A | 2/2017 |
| CN | 206248860 U | 6/2017 |
| CN | 206279086 U | 6/2017 |
| TW | 200500132 | 1/2005 |
| TW | 201127636 | 8/2011 |
| TW | 201609523 | 3/2016 |
| TW | 201927719 | 7/2019 |

\* cited by examiner (A)

(B)

(A)

(B)

HYDROPHOBIC MIRROR AND VEHICLE USING THE SAME

This application claims all benefits accruing under 35 U.S.C. § 119 from China Patent Application No. 201711435382.0, filed on Dec. 26, 2017, in the China National Intellectual Property Administration, the disclosure of which is incorporated herein by reference. This application is related to applications entitled, "A HYDROPHOBIC FILM", filed Dec. 17, 2018 Ser. No. 16/221,955, "A HYDROPHOBIC WINDOW, A HOUSE AND A VEHICLE USING THE SAME", filed Dec. 17, 2018 Ser. No. 16/221,936, "A HYDROPHOBIC MIRROR AND A VEHICLE USING THE SAME", filed Dec. 17, 2018 Ser. No. 16/221,947, "A HYDROPHOBIC FILM", filed Dec. 17, 2018 Ser. No. 16/221,964, and "A HYDROPHOBIC WINDOW, A HOUSE AND A VEHICLE USING THE SAME), filed Dec. 17, 2018 Ser. No. 16/221,973.

BACKGROUND

1. Technical Field

The present disclosure relates to a hydrophobic mirror, and a vehicle using the same.

2. Description of Related Art

Hydrophobic structure has important applications in daily life, such as windows, mirrors and so on. Existing hydrophobic mirrors are prepared by etching directly on the mirror body to form micro-structure and nano-structure, and the micro-structure and nano-structure make the surface of the mirror body hydrophobic. When the hydrophobic property of the hydrophobic mirror is weakened or the micro-structure and nano-structure are damaged, it is often necessary to replace the mirror body. Replacing the mirror body may be time-consuming and costly.

What is needed, therefore, is a hydrophobic mirror with a replaceable hydrophobic film.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
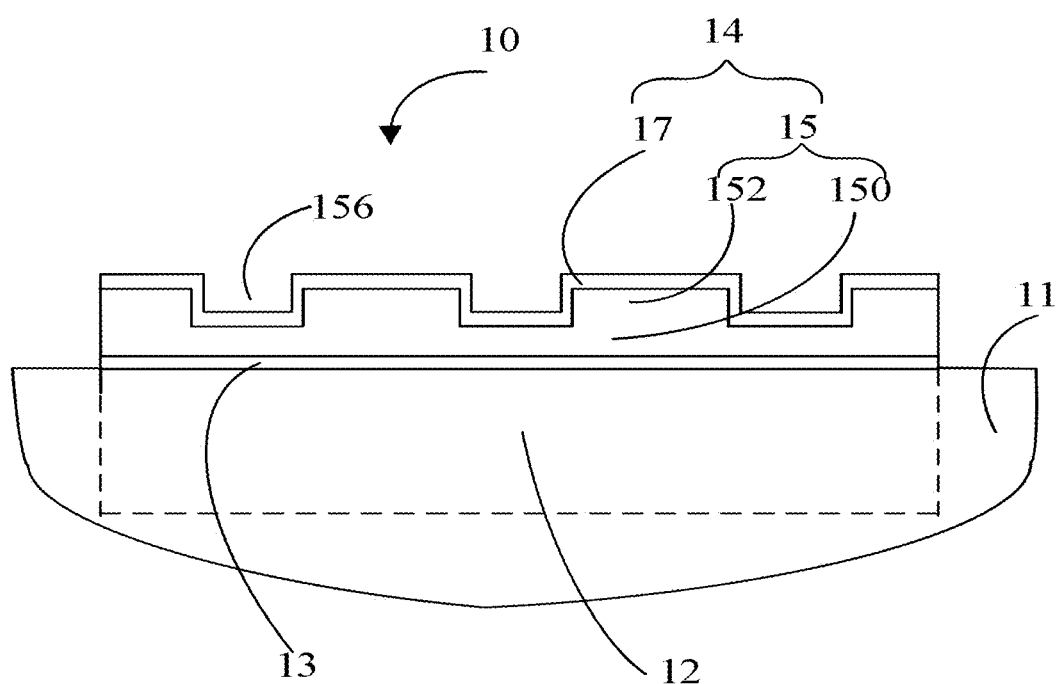
FIG. 1 is a schematic section view of one embodiment of a hydrophobic mirror.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein.

Several definitions that apply throughout this disclosure will now be presented. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one"

embodiment in this disclosure are not necessarily to the same embodiment, and such references mean at least one.

References will now be made to the drawings to describe, in detail, various embodiments of the present hydrophobic film, a method for making the same, and an application of the same.

Figure 2:
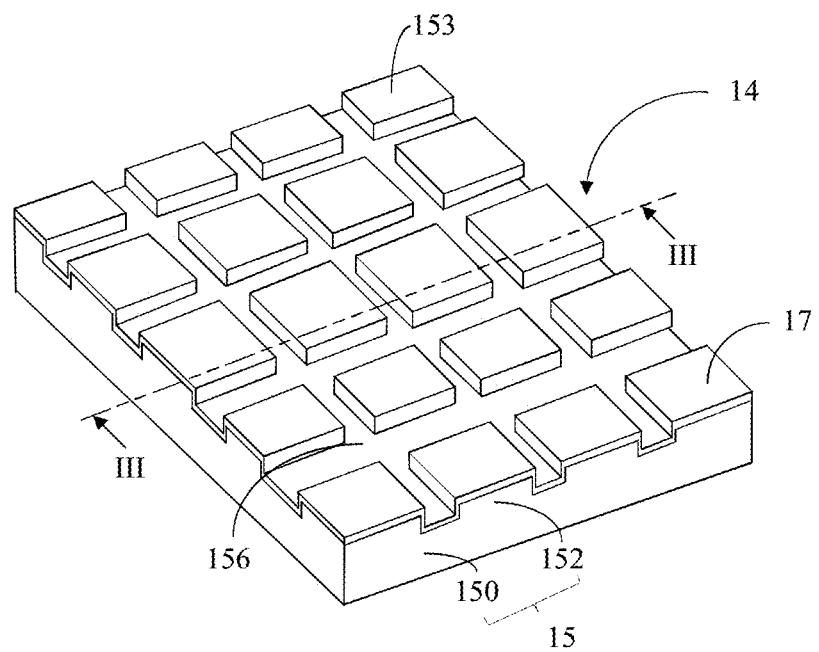
FIG. 2 is a schematic view of one embodiment of a hydrophobic film of FIG. 1.
Figure 2:
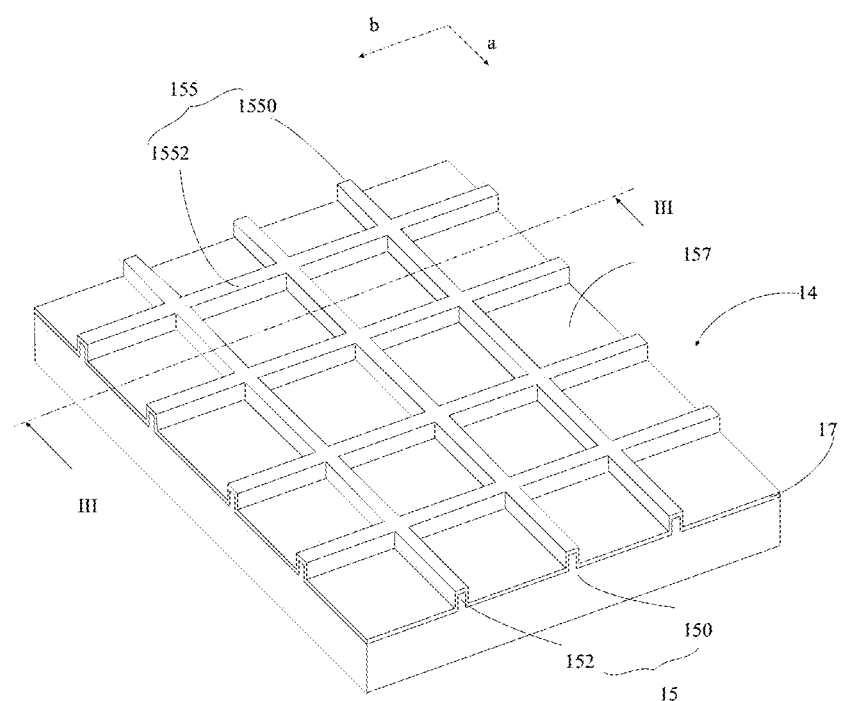

Referring to FIG. 1 and FIG. 2, a hydrophobic mirror 10 of one embodiment is provided. The hydrophobic mirror 10 comprises a support 11, a mirror body 12 set in the support 11, and a hydrophobic film 14 on a surface of the mirror body 12. The hydrophobic film 14 comprises a flexible substrate 15 and a hydrophobic layer 17. The flexible substrate 15 comprises a flexible base 150 and a patterned first bulge layer 152 located on the surface of the flexible base 150 away from the mirror body 12. The hydrophobic layer 17 is located on the surface of the patterned first bulge layer 152.

Figure 3:
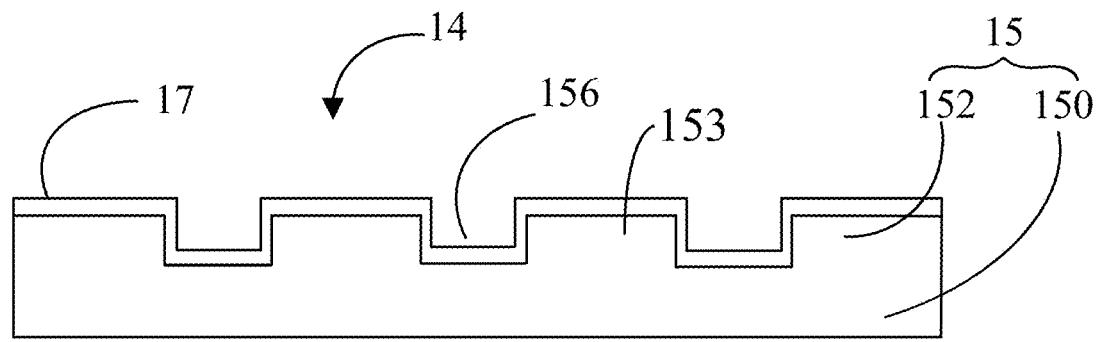
FIG. 3 is a cross-sectional view, along a line of FIG. 2, wherein FIG. 3 (A) corresponds to FIG. 2 (A), and FIG. 3 (B) corresponds to FIG. 2 (B).
Figure 3:
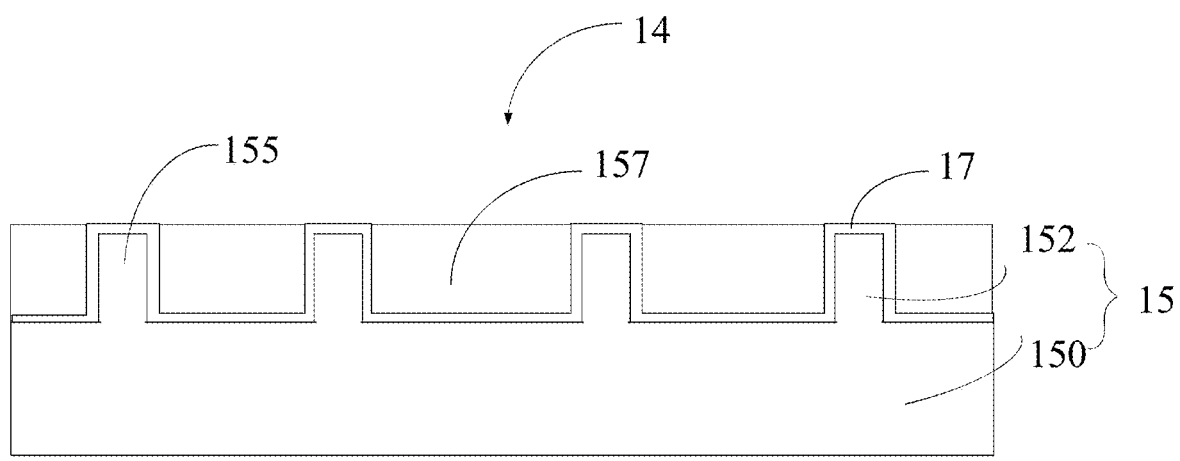

Referring to FIG. 2(A) and FIG. 3(A), the patterned first bulge layer 152 can also comprise a plurality of bumps 153 spaced from each other to form a two-dimensional array and defines a plurality of first grooves 156. Referring to FIG. 2(B) and FIG. 3(B), the patterned first bulge layer 152 can comprise a plurality of strip-shaped bulges 155 intersected with each other to form a net-like structure and defines a plurality of first holes 157. The plurality of strip-shaped bulges 155 comprises a plurality of first strip-shaped bulges 1550 and a plurality of second strip-shaped bulges 1552. The plurality of first strip-shaped bulges 1550 are substantially parallel with each other and extends along the first direction, and the plurality of second strip-shaped bulges 1552 are substantially parallel with each other and extends along the second direction different from the first direction. The angle between the first direction and the second direction is greater than 0 degrees an less than or equal to 90 degrees. In one embodiment, the angle between the first direction and the second direction is greater than 30 degrees. The first direction is defined as the 'a' direction and the second direction is defined as the 'b' direction. In one embodiment, the plurality of strip-shaped bulges 155 are an intergrated structure. The illustration of the embodiment will take FIG. 2(A) and FIG. 3(A) as an example.

Figure 4:
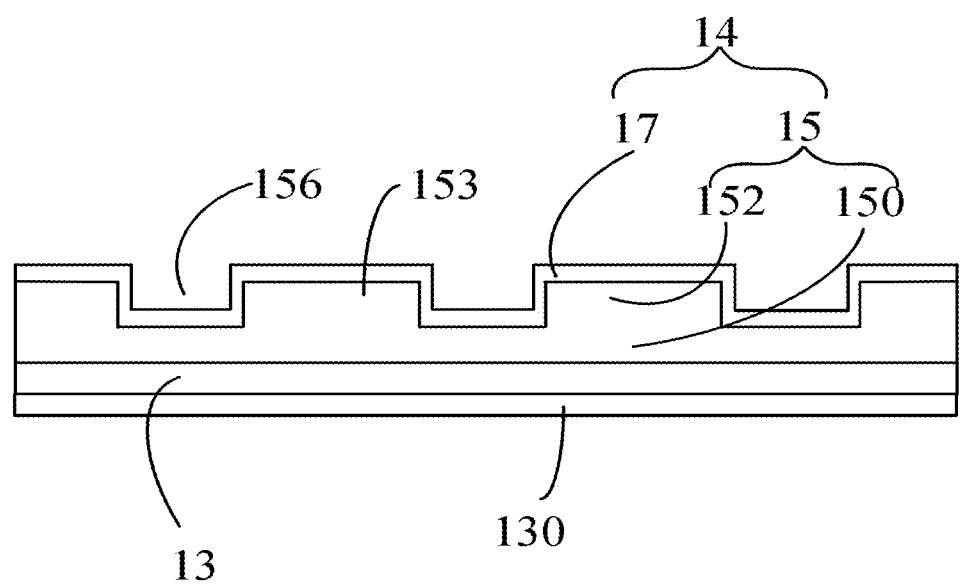
FIG. 4 is a schematic section view of one embodiment of a hydrophobic film with an adhesive layer.

The hydrophobic film 14 can be applied to surfaces of the mirror body 12 through an transparent adhesive layer 13. Therefore, the hydrophobic film 14 can be replaced. When the hydrophobic film 14 is damaged, it may be more economical to replace the hydrophobic film 14 instead of replacing the whole mirror body 12. Referring to FIG. 4, the hydrophobic film 14 comprises an transparent adhesive layer 13 on the surface away from the flexible substrate 15 and a shielded layer 130 on the surface away from the adhesive layer 13. Thus, the hydrophobic film 14 can be pasted onto the surface of the mirror body 12 after removing the shielded layer 130. In this way, setting up an adhesive layer on the surface of the mirror body 12 temporarily can be avoided. It may be more convenient to store and carry by covering the adhesive layer 13 with the shielded layer 130.

The flexible substrate 15 is a flexible transparent film to make the hydrophobic film 14 have flexibility, so that the hydrophobic film 14 can be attached to a curved surface. Specifically, the material of the flexible substrate 15 can be polyethylene terephthalate (PET), polyimide (PI), polymethyl methacrylate (PMMA), polydimethylsiloxane (PDMS), or polyethylene naphthalate (PEN), etc. In one embodiment, the material of the flexible substrate 15 is polyethylene terephthalate. A shape, a size and a thickness of the flexible substrate 15 can be selected according to applications. In one embodiment, the shape of the flexible substrate 15 is a rectangle with the thickness ranging from about 600 nanometers to about 8 millimeters. In one embodiment, the thickness of the flexible substrate 15 can range from about 800 nanometers to about 800 micrometers. In one embodiment, the thickness of the flexible substrate 15 ranges from about 60 micrometers to about 300 micrometers.

The flexible base 150 and the plurality of bumps 153 are an intergrated structure of a same material. The patterned first bulge layer 152 is on the surface of the flexible base 150 away from the mirror body 12. A width of the each of the plurality of bumps 153 can range from about 15 nanometers to about 800 nanometers. In one embodiment, the width of the each of the plurality of bumps 153 can range from about 30 nanometers to about 400 nanometers. In one embodiment, the width of each of the plurality of bumps 153 can range from about 60 nanometers to about 200 nanometers. A height of each of the plurality of the bumps 153 can range from about 75 nanometers to about 800 nanometers. In one embodiment, the height of each of the plurality of the bumps 153 can range from about 80 nanometers to about 450 nanometers. A spacing between the adjacent bumps 153 can range from about 25 nanometers to about 600 nanometers. In one embodiment, the spacing between the adjacent bumps 153 can range from about 30 nanometers to about 135 nanometers. Thus, the width of each of the plurality of first grooves 156 can range from 25 nanometers to 600 nanometers. The height of each of the plurality of first grooves 156 can range from about 80 nanometers to about 400 nanometers. In one embodiment, the width of each of the plurality of first grooves 156 can range from about 40 nanometers to 80 nanometers. The height of each of the plurality of first grooves 156 can range from about 120 nanometers to about 300 nanometers. The spacing between the adjacent bumps 153 ranges from about 30 nanometers to about 80 nanometers. The structure of the patterned first bulge layer 152 shown in FIG. 2(A) is complementary to the structure of the pattern first bulge 152 shown in FIG. 2(B). The plurality of first grooves 156 shown in FIG. 2(A) correspond to the plurality of strip-shaped bulges 155 shown in FIG. 2(B). The plurality of bumps 153 shown in FIG. 2(A) correspond to the plurality of first holes 157 shown in FIG. 2(B).

The hydrophobic layer 17 is on the surface of the patterned first bulge layer 152 of the flexible substrate 15. The hydrophobic layer 17 may be a continuous layer structure or a non-continuous layer structure. The hydrophobic layer 17 can be a single layered structure or a multilayer layered structure. The hydrophobic layer 17 can be located on the surface of the plurality of bumps 153 and the surface of the plurality of first grooves 156. The hydrophobic layer 17 is substantially uniformly deposited on the surface of the plurality of bumps 153 and the surface of the plurality of first grooves 156. A thickness of the hydrophobic layer 17 can range from about 10 nanometers to about 180 nanometers. In one embodiment, the thickness of the hydrophobic layer 17 can range from about 35 nanometers to about 150 nanometers. In one embodiment, the thickness of the hydrophobic layer 17 can range from about 60 nanometers to about 80 nanometers. In one embodiment, the thickness of the hydrophobic layer 17 is about 70 nanometers. A material of the hydrophobic layer 17 can be insulating material or semiconductor material. The insulating material can be silicon dioxide or silicon nitride and so on. The semiconductor material can be gallium nitride or gallium arsenide and so on.

Figure 5:
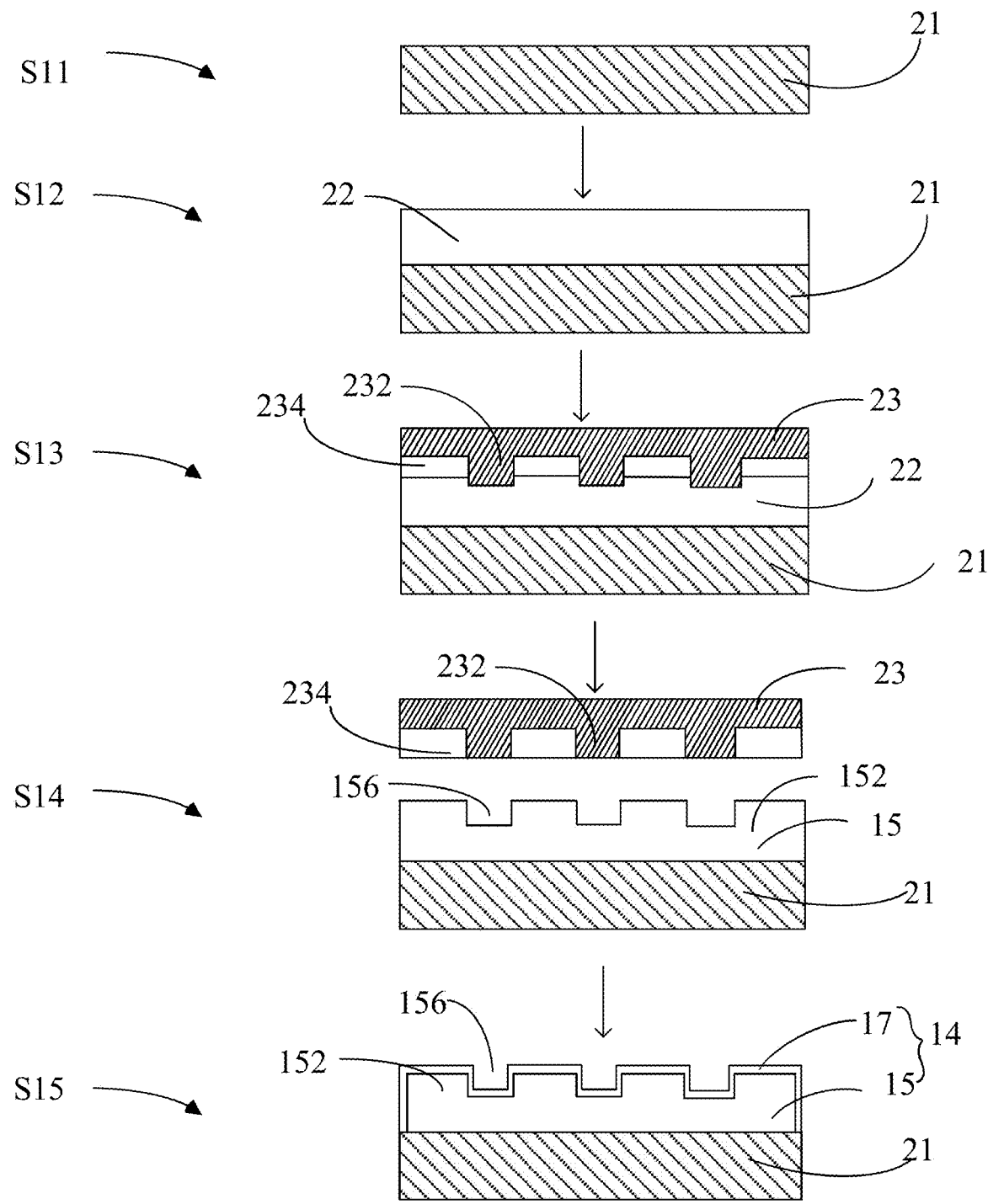
FIG. 5 is a schematic process flowchart of one embodiment of a method for making a hydrophobic film.

Referring to FIG. 5, a schematic process flow for preparing the hydrophobic film 14 of one embodiment comprises:

(S11), providing a hard substrate 21;

(S12), arranging a polymer layer pre-form 22 on the surface of the hard substrate 21, baking the polymer layer pre-form 22 to make the polymer layer pre-form 22 being semisolid;

(S13), providing a template 23 comprising a nano-pattern, forming the patterned first bulge layer 152 by attaching surfaces of a nano-pattern of the template 23 to the polymer layer pre-form 22, then pressing the nano-pattern of the template 23 on to the surface of the polymer layer pre-form 22 to form the patterned first bulge layer 152;

(S14), removing the template 23 to obtain the flexible substrate 15;

(S15), applying a hydrophobic layer 17 on the flexible substrate 15 with the patterned first bulge layer 152.

In (S11), the hard substrate 21 supports the polymer layer pre-form 22. A dimension and a thickness of the hard substrate 21 can be selected according to applications. In one embodiment, the thickness of the hard substrate 21 can range from about 0.5 millimeter to about 1.2 millimeter.

In (S12), the polymer layer pre-form 22 can be imprinted at room temperature, and should have good structural stability and high impression resolution. For example, the impression resolution of the polymer layer pre-form 22 can be less than 10 nanometers. Material of the polymer layer pre-form 22 can be PMMA, PI, PDMS or other silicone oligomers. The polymer layer pre-form 22 is water-soluble vitreous with good mobility at room temperature, and become cross-linked after dehydration.

The polymer layer pre-form 22 can be provided by spin coating or droplet coating. A method for making the polymer layer pre-form 22 comprises: providing a PMMA solution; spin coating PMMA on the surface of the hard substrate 21, wherein a rotation speed can range of 500 rpm to 6000 rpm, and a time period can range from 0.5 minutes to 1.5 minutes; baking the PMMA at a low temperature to make the polymer layer pre-form 22 semisolid. In one embodiment, the PMMA is baked at the temperature below 50 degrees for 3 minutes to 5 minutes. The polymer layer pre-form 22 is formed on the surface of the hard substrate 21. A thickness of the polymer layer pre-form 22 can range from 1 millimeter to 4 millimeters. In one embodiment, the thickness of the polymer layer pre-form 22 can range from about 60 micrometers to 800 micrometers. In one embodiment, the thickness of the polymer layer pre-form 22 can range from about 100 micrometers to about 300 micrometers.

In (S13), the template 23 comprises a patterned third bulge layer 232. The patterned third bulge layer 232 can comprise a plurality of strip-shaped bulges intersected with each other to form a net-like structure and define a plurality of third holes 234. A structure of the plurality of strip-shaped bulges is an intergrated structure. Material of the template 23 can be hard materials such as nickel, silicon, or silicon dioxide. In one embodiment, the material of the template 23 is silicon dioxide.

Figure 6:
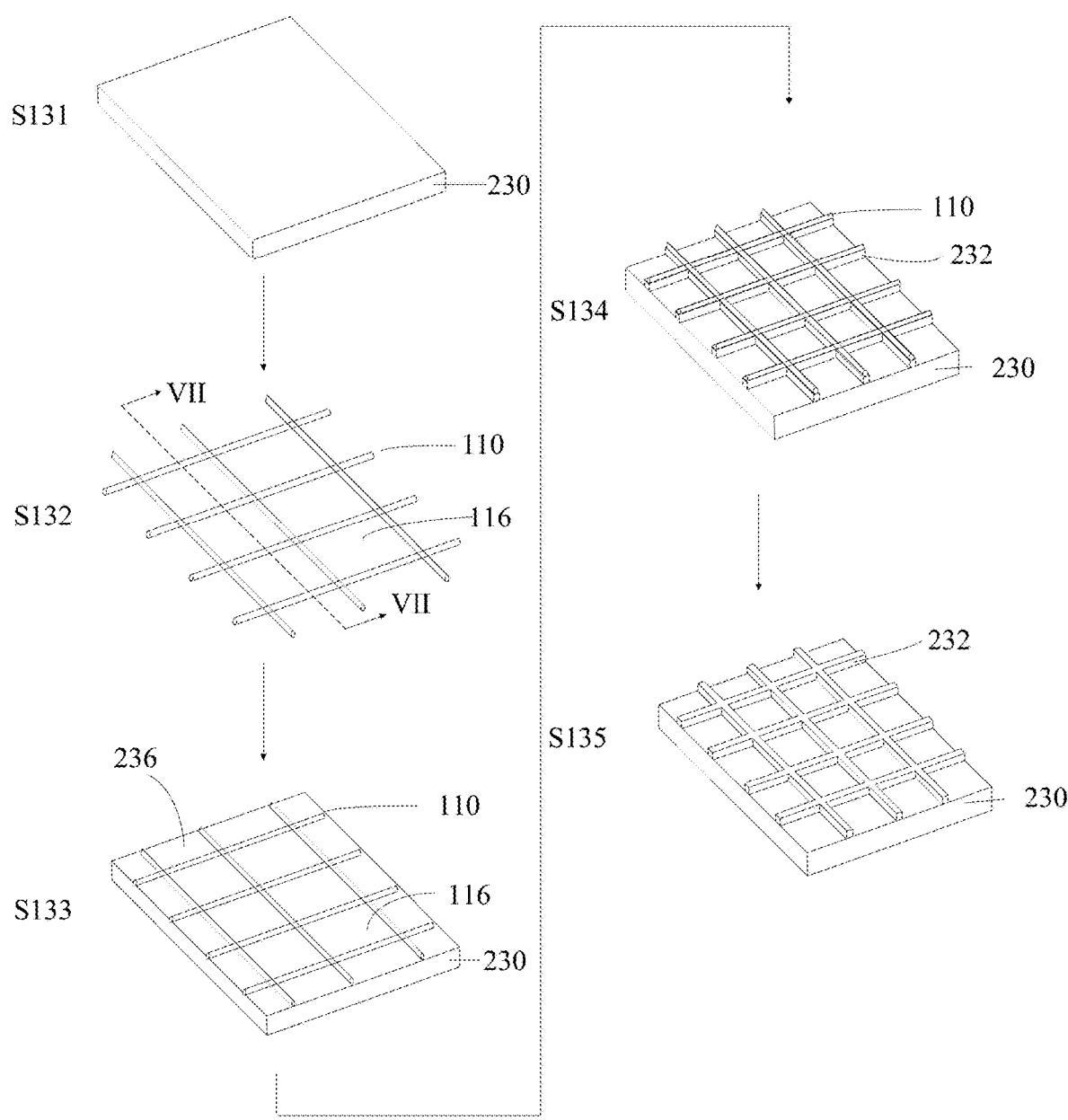
FIG. 6 is a schematic process flowchart of one embodiment of a method for making a template.
Figure 7:
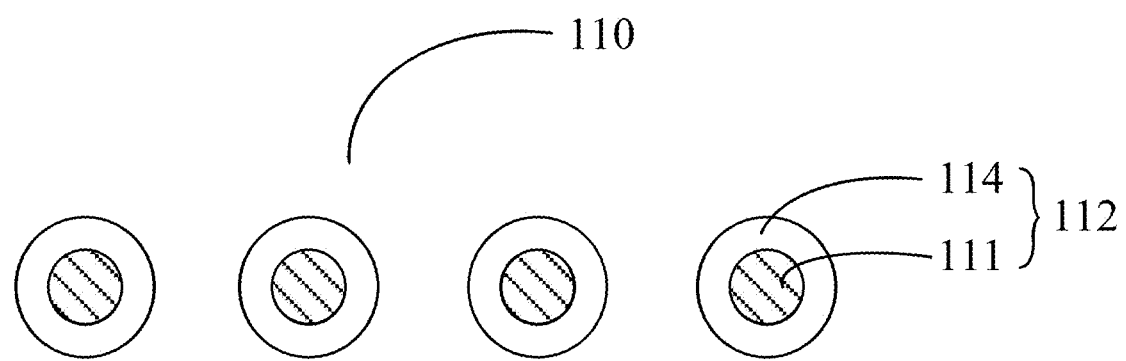
FIG. 7 is a cross-sectional view along line VII-VII of a carbon nanotube composite structure in S132 of FIG. 6.

Referring to FIGS. 6-7 together, a schematic process flow for preparing the template 23 of one embodiment includes:

(S131), providing a base 230;

(S132), providing a carbon nanotube structure 110, wherein the carbon nanotube structure 110 includes a plurality of carbon nanotubes intersected with each other and a plurality of openings 116 defined between the intersected carbon nanotubes;

(133), placing the carbon nanotube structure 110 on the surface 236 of the base 230, wherein parts of the surface 236 are exposed from the plurality of openings 116;

(134), forming the template 23 with the patterned third bulge layer 232 by dry etching the base 230 wherein the carbon nanotube structure 110 masks the base 230, wherein the patterned third bulge layer 232 includes a plurality of strip-shaped bulges;

(135), removing the carbon nanotube structure 110.

In (S131), material of the base 230 can be metal material, insulating material or semiconductor material. The metal material can be gold, aluminum, nickel, chromium, copper. The insulating material can be silicon dioxide or silicon nitride. The semiconductor material can be silicon, gallium nitride or gallium arsenide.

In (S132), the carbon nanotube structure 110 can be a pure carbon nanotube structure 111 or a carbon nanotube composite structure 112. The pure carbon nanotube structure 111 means that the carbon nanotube structure 110 consists of a plurality of carbon nanotubes and does not include other structural components. The carbon nanotube composite structure 112 comprises a pure carbon nanotube structure 111 and a protective layer 114 coated on the pure carbon nanotube structure 111 as shown in FIG. 7. The protective layer 114 is coated on surfaces of the plurality of carbon nanotubes. In one embodiment, the protective layer 114 is coated on the surfaces of every carbon nanotube. The pure carbon nanotube structure 111 includes a plurality of carbon nanotubes. The plurality of carbon nanotubes are orderly arranged to form an ordered carbon nanotube structure and apertures are defined in the ordered carbon nanotube structure. The plurality of apertures extend throughout the pure carbon nanotube structure 111 from the thickness direction. The plurality of carbon nanotubes can be single-walled carbon nanotubes, double-walled carbon nanotubes, or multi-walled carbon nanotubes. The plurality of the carbon nanotubes are parallel to a surface of the pure carbon nanotube structure 111. The surface is the largest surface of the carbon nanotube structure 111 formed by arranging the plurality of carbo nanotubes substantially parallel in the surface. A length and a diameter of the plurality of carbon nanotubes can be selected according to need. The diameter of the single-walled carbon nanotubes can range from about 0.5 nanometers to about 10 nanometers. The diameter of the double-walled carbon nanotubes can range from about 1.0 nanometer to about 15 nanometers. The diameter of the multi-walled carbon nanotubes can range from about 1.5 nanometers to about 500 nanometers. The length of the carbon nanotubes can be greater than 50 micrometers. In one embodiment, the length of the carbon nanotubes can range from about 200 micrometers to about 900 micrometers.

The pure carbon nanotube structure 111 comprises a plurality of carbon nanotubes. The plurality of carbon nanotubes are orderly arranged to form an ordered carbon nanotube structure and define a plurality of apertures. The plurality of apertures can be a plurality of holes defined by several adjacent carbon nanotubes intersected with each other or a plurality of gaps defined by adjacent two substantially parallel arranged carbon nanotubes and extending along an axial direction of the carbon nanotubes. The plurality of holes and the plurality of gaps can co-exist in the pure carbon nanotube structure 111. Hereafter, a size of each of the plurality of apertures is the diameter of the hole or a width of the gap. The sizes of the apertures can be different. The sizes of the apertures can range from about 2 nanometers to about 500 micrometers, or about 20 nanometers to about 60 micrometers, or about 80 nanometers to about 5 micrometers, or about 200 nanometers to about 1.5 micrometers. The sizes refer to the diameters of the holes or the distances between the gaps in the width direction.

The plurality of carbon nanometers are orderly arranged to form an ordered carbon nanotube structure. The plurality of carbon nanotubes extend along a direction substantially parallel to the surface of the pure carbon nanotube structure 111. The term 'ordered carbon nanotube structure' includes, but is not limited to, a structure wherein the plurality of carbon nanotubes are arranged in a consistently systematic manner, e.g., the plurality of carbon nanotubes are arranged approximately along the same direction. The plurality of carbon nanotubes are tightly connected by Van der Waals forces, so that the pure carbon nanotube structure 111 and the carbon nanotube composite structure 112 are a freestanding structure. The term "free-standing" indicates that the carbon nanotube structure 110 can sustain a weight of itself when it is hoisted a portion thereof without any significant damage to its structural integrity. Thus, the carbon nanotube structure 110 can be suspended by two supports space apart.

The pure carbon nanotube structure 111 comprises at least one carbon nanotube film, at least one carbon nanotube wire, or the combination thereof. In one embodiment, the pure carbon nanotube structure 111 comprises a single carbon nanotube film or two or more carbon nanotube films stacked together. Thus, the thickness of the carbon nanotube structure 111 can be controlled by a number of the stacked carbon nanotube films. The carbon nanotube film includes a plurality of uniformly distributed carbon nanotubes. The plurality of uniformly distributed carbon nanotubes are arranged approximately along the same direction. In one embodiment, the pure carbon nanotube structure 111 is formed by folding a single carbon nanotube wire. The carbon nanotube wire can be untwisted or twisted. In one embodiment, the pure carbon nanotube structure 111 can include a layer of parallel and spaced carbon nanotube wires. In another embodiment, a carbon nanotube structure 111 is a net-like structure and formed by intersecting or weaving the plurality of carbon nanotube wires together. A distance between two adjacent parallel and spaced carbon nanotube wires can range from about 1 nanometer to about 0.5 micrometers. Gaps between two adjacent substantially parallel carbon nanotube wires are defined as the apertures. The sizes of the apertures can be controlled by controlling the distances between two adjacent parallel and spaced carbon nanotube wires. The lengths of the gaps between two adjacent parallel carbon nanotube wires can be equal to the lengths of the carbon nanotube wires. It is understood that any carbon nanotube structure as described above can be used with all embodiments.

Figure 8:
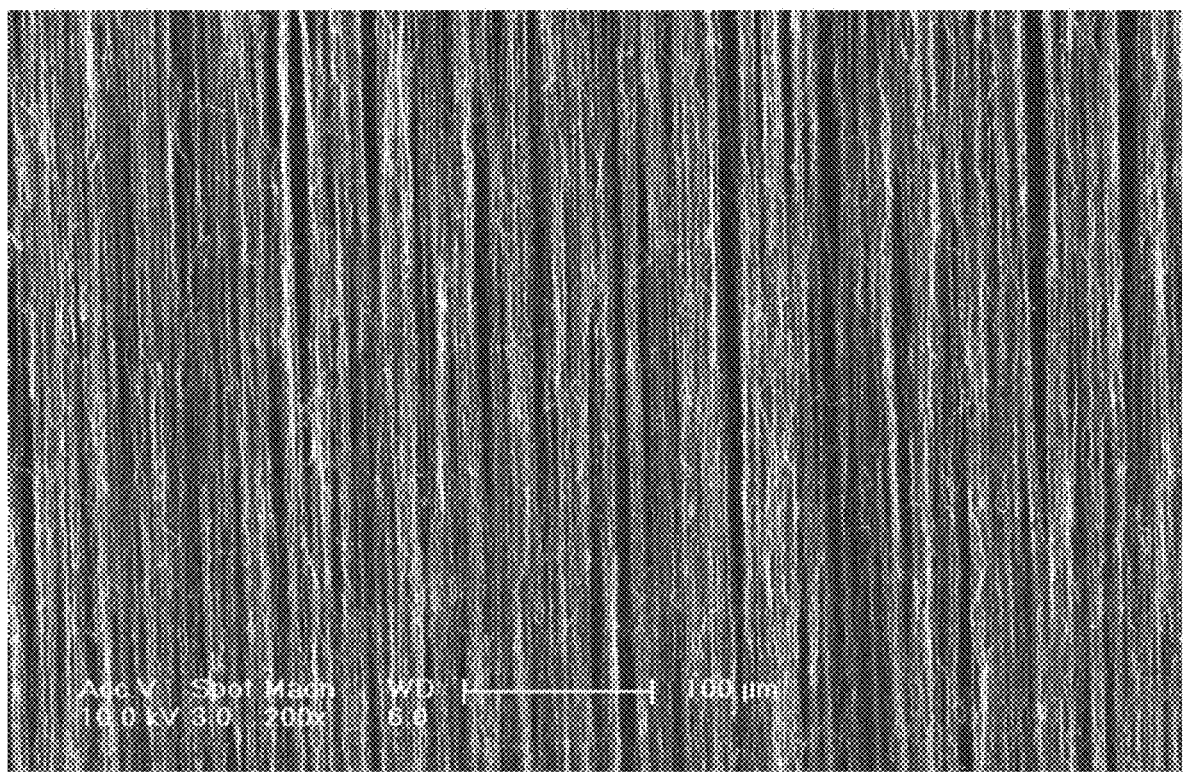
FIG. 8 is a Scanning Electron Microscope (SEM) image of a drawn carbon nanotube film of one embodiment.

In one embodiment, the pure nanotube structure 111 includes at least one drawn carbon nanotube film. The drawn carbon nanotube film can be drawn from a carbon nanotube array that is able to have a film drawn therefrom. The drawn carbon nanotube film includes a plurality of successive and oriented carbon nanotubes joined end-to-end by van der Waals attractive force therebetween. The drawn carbon nanotube film is a free-standing structure. Referring to FIG. 8, each of the drawn carbon nanotube film includes a plurality of successively oriented carbon nanotube segments joined end-to-end and side-by-side by van der Waals attractive force therebetween. Each of the carbon nanotube segments includes a plurality of carbon nanotubes parallel to each other, and joined by van der Waals attractive force therebetween. As can be seen in FIG. 8, some variations can occur in the drawn carbon nanotube film. The carbon nanotubes in the drawn carbon nanotube film are oriented along a preferred orientation. The drawn carbon nanotube film can be treated with an organic solvent to increase a mechanical strength and a toughness and to reduce a coefficient of friction of the drawn carbon nanotube film. Diameters of carbon nanotube segments can range from about 10 nanometers to 200 nanometers. In one embodiment, the diameters of nanotube segments can range from about 10 nanometers to 100 nanometers. The drawn carbon nanotube film defines apertures between adjacent carbon nanotubes. The apertures extend throughout the drawn carbon nanotube film along the thickness direction thereof. The apertures can be micro pores or gaps. In one embodiment, the pure carbon nanotube structure 111 includes one drawn carbon nanotube film. Gaps are defined between the adjacent carbon nanotube segments in the carbon nanotube film. Sizes of the gaps can range from about 1 nanometer to 0.5 micrometers.

The pure carbon nanotube structure 111 can also include at least two of the drawn carbon nanotube films stacked together. In other embodiments, the pure carbon nanotube structure 111 can include two or more of the carbon nanotube films which coplanar arranged. Additionally, when the carbon nanotubes in the carbon nanotube film are aligned along the preferred orientation (e.g., the drawn carbon nanotube film), an angle can exist between the preferred orientations of carbon nanotubes films, whether the carbon nanotube films are stacked or arranged side-by-side. Adjacent carbon nanotube films can be joined by the van der Waals attractive force therebetween. An angle between the aligned directions of the carbon nanotubes in two adjacent carbon nanotube films can range from about 0 degrees to about 90 degrees. When the angle between the aligned directions of the carbon nanotubes in adjacent stacked drawn carbon nanotube films is larger than 0 degrees, a plurality of micro pores are defined by the pure carbon nanotube structure 111. In one embodiment, the pure carbon nanotube structure 111 has the aligned directions of the carbon nanotubes between adjacent stacked drawn carbon nanotube films at 90 degrees. Diameters of the micro pores can range from about 1 nanometer to about 0.5 micrometers. The thickness of the pure carbon nanotube structure 111 can range from about 0.01 micrometers to about 100 micrometers. Stacking the carbon nanotube films will also add to the structural integrity of the pure carbon nanotube structure 111.

Figure 9:
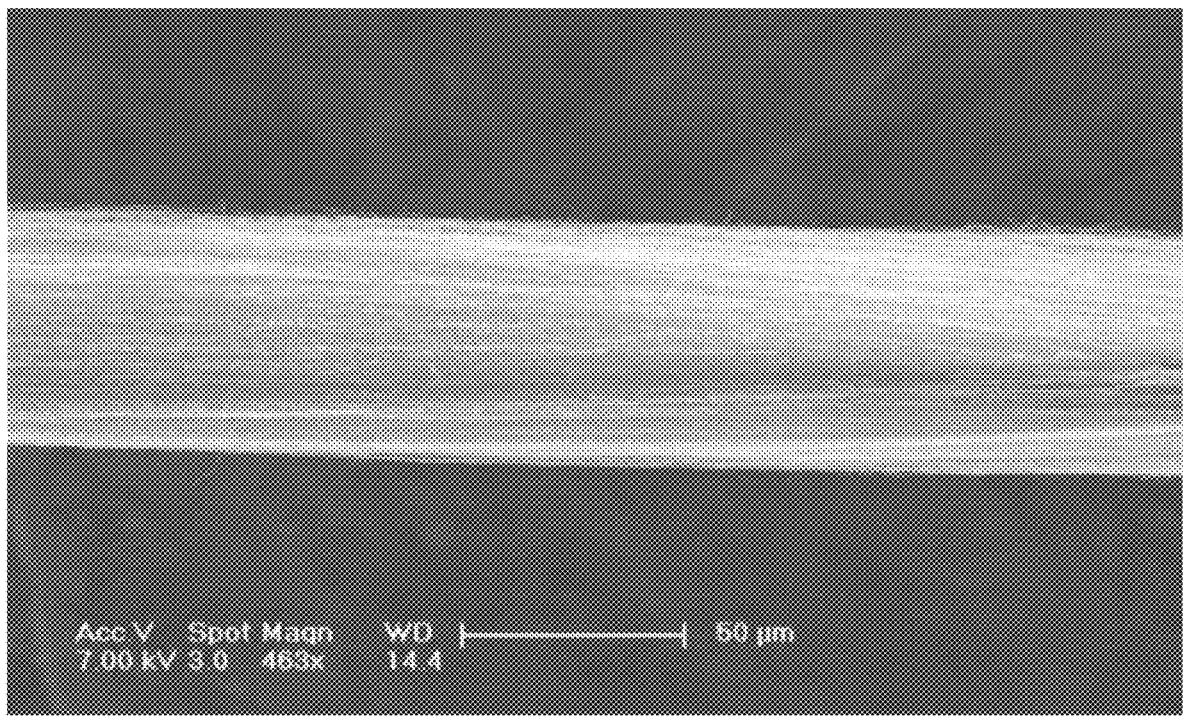
FIG. 9 is a SEM image of an untwisted carbon nanotube wire of one embodiment.

The carbon nanotube wire can be untwisted or twisted. Treating the drawn carbon nanotube film with a volatile organic solvent can form the untwisted carbon nanotube wire. Specifically, the organic solvent is applied to soak the entire surface of the drawn carbon nanotube film. During the soaking, adjacent parallel carbon nanotubes in the drawn carbon nanotube film will bundle together, due to surface tensions of the organic solvent as it volatilizes, and thus, the drawn carbon nanotube film will shrunk into an untwisted carbon nanotube wire. Referring to FIG. 9, the untwisted carbon nanotube wire includes a plurality of carbon nanotubes substantially oriented along the same direction (i.e., a direction along a length of the untwisted carbon nanotube wire). The carbon nanotubes are substantially parallel to the axis of the untwisted carbon nanotube wire. More specifically, the untwisted carbon nanotube wire includes a plurality of successive carbon nanotube segments joined end to end by van der Waals attractive force therebetween. Each of the carbon nanotube segments includes a plurality of carbon nanotubes substantially parallel to each other, and joined by van der Waals attractive force therebetween. The carbon nanotube segments can vary in width, thickness, uniformity, and shape. The length of the untwisted carbon nanotube wire can be arbitrarily set as required. A diameter of the untwisted carbon nanotube wire ranges from about 0.5 nanometers to about 100 micrometers.

Figure 10:
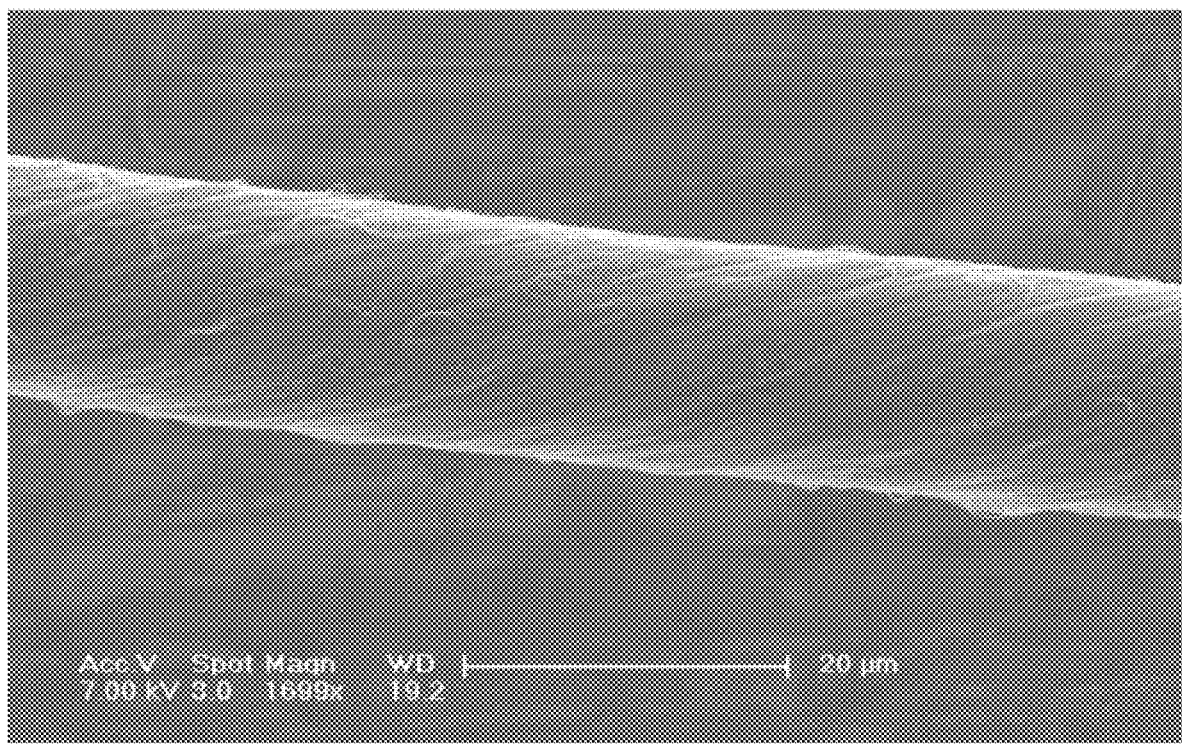
FIG. 10 is a SEM image of a twisted carbon nanotube wire of one embodiment.

The twisted carbon nanotube wire can be formed by twisting a drawn carbon nanotube film by mechanical forces to turn the two ends of the drawn carbon nanotube film in opposite directions. Referring to FIG. 10, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each of the carbon nanotube segments includes a plurality of carbon nanotubes parallel to each other, and joined by van der Waals attractive force therebetween. The length of the carbon nanotube wire can be set as required. A diameter of the twisted carbon nanotube wire can be from about 0.5 nanometers to about 100 micrometers. Further, the twisted carbon nanotube wire can be treated with a volatile organic solvent after being twisted to bundle the adjacent paralleled carbon nanotubes together. A specific surface area of the twisted carbon nanotube wire will decrease, while a density and strength of the twisted carbon nanotube wire will increase.

The carbon nanotube composite structure 112 can be made by applying a protective layer 114 on surfaces of the pure carbon nanotube structure 111. In one embodiment, the pure carbon nanotube structure 111 can include two stacked drawn carbon nanotube films, wherein the stacked drawn carbon nanotube films are vertically intersected. The pure carbon nanotube structure 111 can be suspended in a depositing chamber during deposition of the protective layer 114 so that two opposite surfaces of the pure carbon nanotube structure 111 are coated with the protective layer 114. In some embodiments, each of the plurality of carbon nanotubes is fully enclosed by the protective layer 114. In one embodiment, the carbon nanotube composite structure 112 is placed on a frame so that a middle portion of the carbon nanotube composite structure 112 is suspended through the through hole of the frame. The frame can be any shape, such as a quadrilateral. The carbon nanotube composite structure 112 can also be suspended by a metal mesh or metal ring.

The method of depositing the protective layer 114 can be physical vapor deposition (PVD), chemical vapor deposition (CVD), atomic layer deposition (ALD), magnetron sputtering, or spraying.

The plurality of openings 116 are defined by the plurality of apertures of the pure carbon nanotube structure 111. The plurality of openings 116 of the carbon nanotube composite structure 112 and the plurality of apertures of the pure carbon nanotube composite structure 111 may have a same shape but different in sizes. The sizes of the plurality of openings 116 of the carbon nanotube composite structure 112 are smaller than those of the plurality of apertures because the protective layer 114 is deposited in the plurality of apertures.

A thickness of the protective layer 114 can range from about 5 nanometers to about 150 nanometers. In one embodiment, the thickness of the protective layer 114 can range from about 8 nanometers to about 45 nanometers. If the thickness of the protective layer 114 is less than 5 nanometers, the protective layer 114 cannot prevent the carbon nanotubes from being destroyed in following etching process. If the thickness of the protective layer 114 is greater than 150 nanometers, the plurality of apertures may be fully filled by the protective layer 114 and the plurality of openings 116 cannot be obtained.

The material of the protective layer 114 can be metal, metal oxide, metal nitride, metal carbide, metal sulfide, silicon oxide, silicon nitride, or silicon carbide. The metal can be gold, nickel, titanium, iron, aluminum, titanium, chromium, or alloy thereof. The metal oxide can be alumina, magnesium oxide, zinc oxide, or hafnium oxide. The material of the protective layer 114 is not limited above and can be any material as long as the material can be deposited on the pure carbon nanotube structure 111, would not react with the carbon nanotubes and would not be etched easily in following drying etching process. The protective layer 114 is combined with the carbon nanotube structure 111 by van der Waals attractive force therebetween only.

Figure 11:
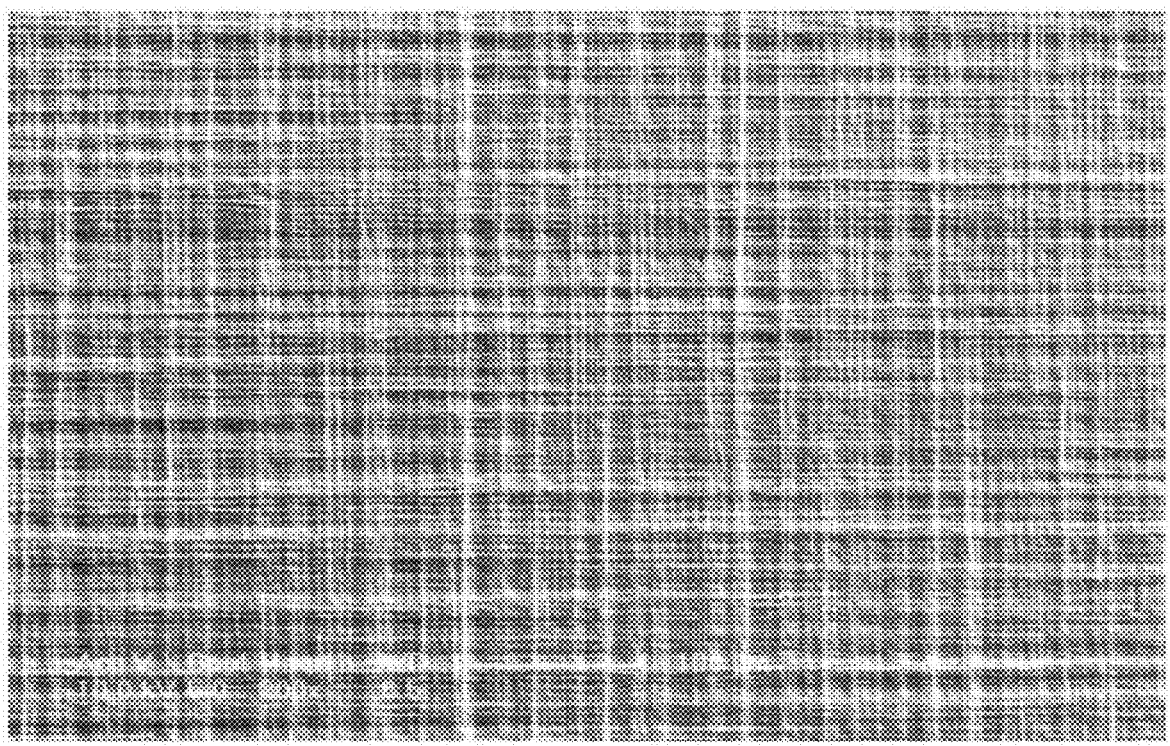
FIG. 11 is a SEM image of a carbon nanotube composite structure of one embodiment.
Figure 12:
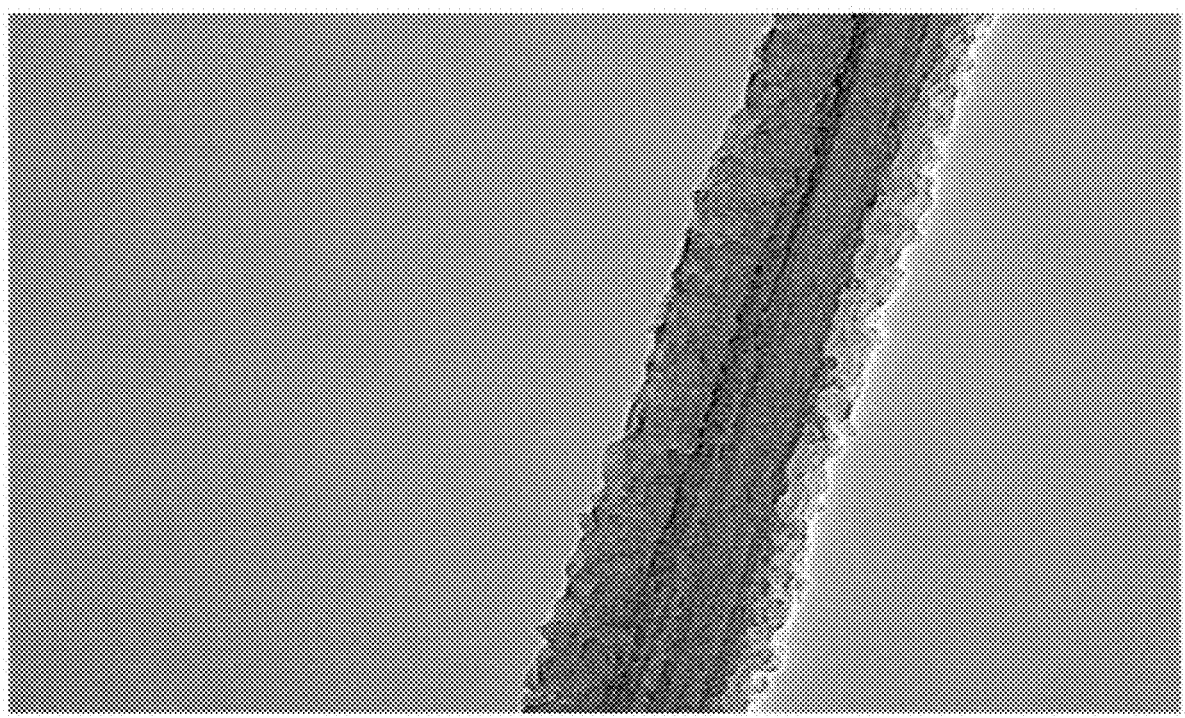
FIG. 12 is a SEM image of a single carbon nanotube coated with an alumina ($Al_2O_3$) layer.

As shown in FIG. 11, in one embodiment, an alumina layer of 5 nanometers thickness is deposited on two stacked drawn carbon nanotube films by electron beam evaporation. As shown in FIG. 12, each of the carbon nanotubes is entirely coated by the alumina layer. The aligned direction of the carbon nanotubes between adjacent stacked drawn carbon nanotube films is 90 degrees.

In (S133), the carbon nanotube structure 110 can directly contact with the surface 236 of the base 230 or suspended above the surface 236 of the base 230 by a support. In one embodiment, the carbon nanotube structure 110 is transferred on the surface 236 of the base 230 through the frame.

In one embodiment, the carbon nanotube composite structure 112 is adopted. The placing the carbon nanotube composite structure 112 on the surface 236 further comprises solvent treating the base 230 with the carbon nanotube composite structure 112 thereon. Because air is trapped between the carbon nanotube composite structure 112 and the surface 236 of the base 230, the solvent treating can exhaust the air and allow the carbon nanotube composite structure 112 to be closely and firmly adhered on the surface 236 of the base 230. The solvent treating can be carried out by applying a solvent to entire surface of the carbon nanotube composite structure 112 or immersing an entire base 230 with the carbon nanotube composite structure 112 in a solvent. The solvent can be water or volatile organic solvent such as ethanol, methanol, acetone, dichloroethane, chloroform, or mixtures thereof. In one embodiment, the organic solvent is ethanol.

In (S134), the dry etching can be plasma etching or reactive ion etching (ME). In one embodiment, the dry etching is performed by applying plasma energy on the entire or part surface of the surface 236 via a plasma device. A plasma gas can be an inert gas and/or etching gases, such as argon (Ar), helium (He), chlorine ($Cl_2$), hydrogen ($H_2$), oxygen ($O_2$), fluorocarbon ($CF_4$), ammonia ($NH_3$), or air.

In one embodiment, the plasma gas is a mixture of chlorine and argon. The power of the plasma device can range from about 20 watts to about 70 watts. A plasma flow of chlorine can range from about 5 standard cubic centimeters per minutes (sccm) to about 20 sccm, such as 10 sccm. A plasma flow of argon can range from about 15 sccm to about 40 sccm, such as 25 sccm. When the plasma is produced in vacuum, a work pressure of the plasma can range from about 2 Pa to 10 Pa, such as 6 Pa. A time period for plasma etching can range from about 10 seconds to about 400 seconds, such as 20 seconds.

In the plasma etching process, the plasma gas would react with the exposed portion of the base 230 and would not react with the protective layer 114, or reaction between the plasma gas and the protective layer 114 is much slower than reaction between the plasma gas and the base 230. The selection relationship of the plasma gas, material of the base 230 and material of the protective layer 114 is shown in Table 1 below.

TABLE 1

| Number | Base | Protective layer | Plasma gas |
|---|---|---|---|
| 1 | Al | $SiO_2$ | $Cl_2$ or $BCl_3$ |
| 2 | $SiO_2$ | Al, Cr, Fe, Ti, Ni, or Au | $CF_4$ |
| 3 | $SiN_x$ | Al, Cr, Fe, Ti, Ni, or Au | $CF_4$ |
| 4 | GaN | $Al_2O_3$ | $Cl_2$ or $Ar_2$ |
| 5 | Au, Cr or Ni | $SiO_2$ or $SiN_x$ | $O_2$ or $Ar_2$ |
| 6 | Cu | $SiO_2$ or $SiN_x$ | $O_2$ or $BCl_3$ |

In the etching process, the etching gas reacts with the base 230, but does not react with the protective layer 114 or react with the protective layer 114 at a speed much less than that of the reaction between the etching gas and the base 230. Thus, the exposed portion of the base 230 would be etched gradually and the portion of the base 230 that are shielded by the carbon nanotube composite structure 112 would not be etched.

The patterned third bulge layer 232 and the carbon nanotube composite structure 112 substantially have the same pattern. When the carbon nanotube structure 112 includes a plurality of intersected drawn carbon nanotube films, the patterned third bulge layer 232 includes a plurality of strip-shaped bulges intersected with each other to form a net-like structure.

The plurality of strip-shaped bulges of the patterned third bulge layer 232 can have a width ranging from about 25 nanometers to about 600 nanometers, a distance between the two adjacent strip-shaped bulges in width direction ranging from about 15 nanometers to about 800 nanometers, and a height ranging from about 75 nanometers to about 800 nanometers. In one embodiment, the plurality of strip-shaped bulges can have a width ranging from about 30 nanometers to about 135 nanometers, a distance ranging from about 30 nanometers to about 200 nanometers, and a height ranging from about 80 nanometers to about 400 nanometers. In other embodiments, the plurality of strip-shaped bulges can have a width ranging from about 30 nanometers to about 80 nanometers, a distance ranging from about 40 nanometers to about 80 nanometers, and a height ranging from about 120 nanometers to about 300 nanometers.

Figure 13:
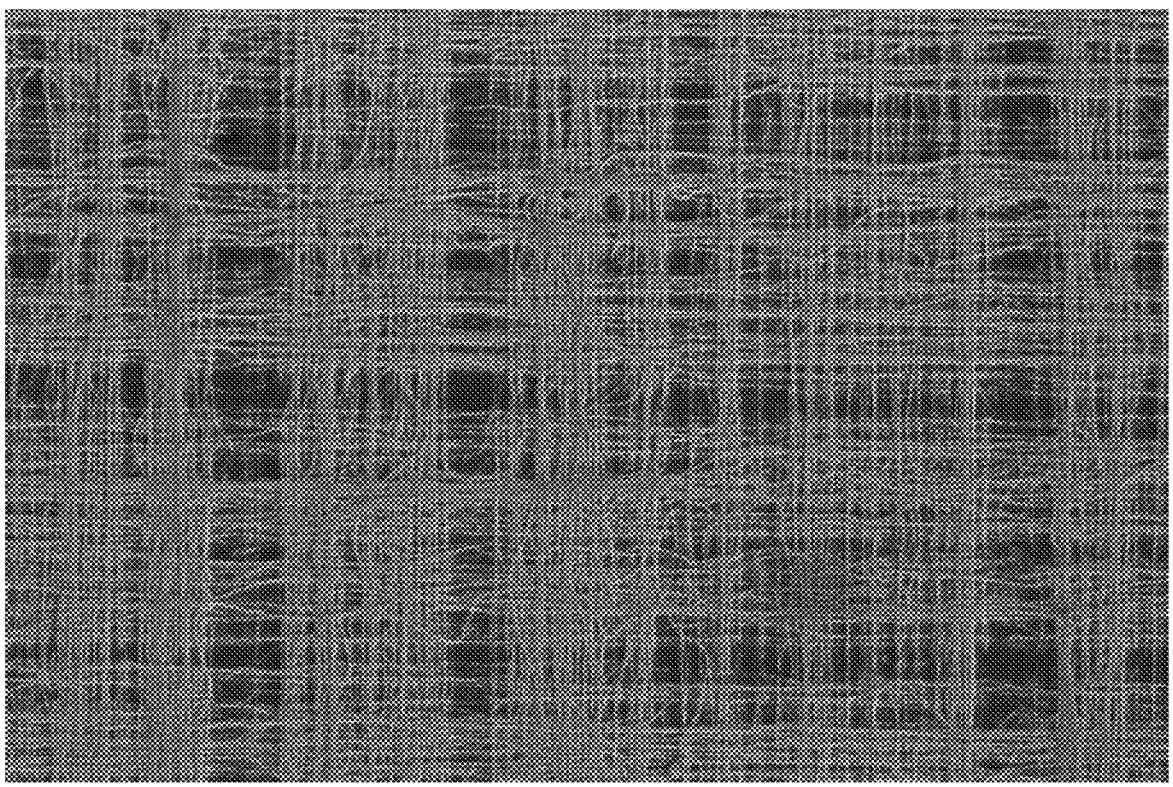
FIG. 13 is a SEM image of a hydrophobic film according to FIG. 1.
Figure 14:
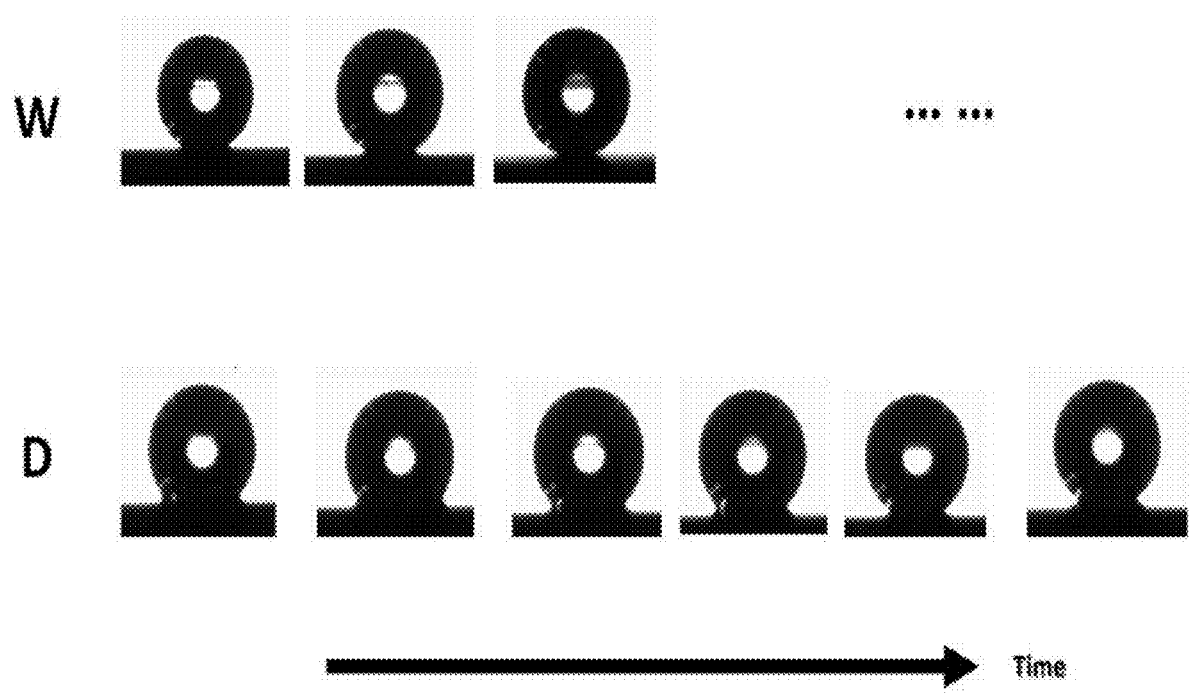
FIG. 14 is a performance test chart of the hydrophobic film according to FIG. 1.

After coating with the protective layer 114, the diameters of the carbon nanotubes are about tens of nanometers, and distances between adjacent two carbon nanotubes are about tens of nanometers. Thus, the widths and distances of the plurality of bumps 153 are also tens of nanometers, and the average diameter of the plurality of grooves 156 are also tens of nanometers, as shown in FIG. 13. The density of the bumps 153 and the grooves 156 would be increased. For example, when both the width and distance of the plurality of bumps 153 are 25 nanometers, the number of the bumps 153 and the grooves 156 would be 40 within 1 micrometer. The conventional photolithography method cannot make all the bumps 153 in nano-scale and obtain this density due to the resolution limitation. Referring to FIG. 14, the hydrophobic property of the hydrophobic film. "W" refers to static contact angle, and "D" refers to dynamic scroll angle.

In (S135), the method of removing the carbon nanotube composite structure 112 can be ultrasonic method, or adhesive tape peeling, oxidation. In one embodiment, the template 23 with the carbon nanotube composite structure 112 thereon is placed in an N-methyl pyrrolidone solution and ultrasonic treating for several minutes.

The nanoscale patterns are formed on the surface of the polymer layer pre-form 22 to prepare the flexible substrate 15 with the nanoscale patterns by nanoimprinting method. In detail, the polymer layer pre-form 22 located on the hard substrate 21 is baked at low temperature to make the polymer layer pre-form 22 semisolid. The surface with nanoscale patterns of the template 23 is bonded to the polymer layer pre-form 22. When the template 23 is pressed, the degree of vacuum ranges between $1 \times 10^{-1}$ to $1 \times 10^{-5}$ bar and the pressure ranges between 2 Psi to 100 Psi, and the time of applying pressure ranges between 2 minutes to 30 minutes. The state of polymer layer pre-form 22 after baking is semisolid with good mobility. The PMMA can flow spontaneously into channels of the template 23 under pressure.

The flexible substrate 15 comprises a patterned first bulge layer 152. The patterned first bulge layer 152 comprises a plurality of bumps 153 spaced from each other to form a two-dimensional array and define a plurality of first grooves 156. The shape, size and thickness of the flexible substrate 15 are corresponding to the plurality of third holes 234 of the template 23. The patterned third bulge layer 232 of the template 23 is presses into the inside of the polymer layer pre-form 22 and the polymer layer pre-form 22 is deformed under the pressure to form a flexible substrate 15 having nanoscale patterns. The part of the polymer layer pre-form 22 corresponding to the patterned third bulge layer 232 is compressed to form the first grooves 156. The PMMA flows into the plurality of third holes 234 of the template 23 under pressure, and the patterned first bulge layer 152 is formed. In one embodiment, the width of each of the plurality of first grooves 156 can range from 20 nanometers to 200 nanometers. The width of each of the plurality of bumps 153 can range from 30 nanometers to 300 nanometers.

In (S14), the method for removing the template 23 is not limited, such as mechanical removal and corrosion. What's more, the polymer layer 22 is baked for 3-5 minutes in an oven having an internal temperature of 120 degrees –180 degrees to form a flexible and complete flexible substrate 15 after removing the template 23.

In (S15), the method of depositing the hydrophobic layer 17 can be ion beam sputtering, atomic layer deposition, magnetron sputtering, evaporation and chemical vapor deposition or physical vapor deposition. The hydrophobic layer 17 is deposited on the surface of bumps 153 and the surface of the flexible substrate 15 between the adjacent bumps 153. The thickness of the hydrophobic layer 17 can range from about 10 nanometers to 180 nanometers. In one embodiment, the thickness of the hydrophobic layer 17 is 70 nanometers.

The advantages of the method for making the hydrophobic film 14 are as follows. Firstly, the flexible substrate 15 makes the hydrophobic film 14 have flexibility. Secondly, the hydrophobic property of the hydrophobic will be outstandingly enhanced for the reason that the width and distance of the plurality of strip-shaped bulges are tens of nanometers. Thirdly, the carbon nanotube structure is used as a frame to prepare a mask layer, so that it is easy to make patterned bulge. In addition, the preparation method of the disclosure is simple, efficient, and easy to be industrialized.

Figure 15:
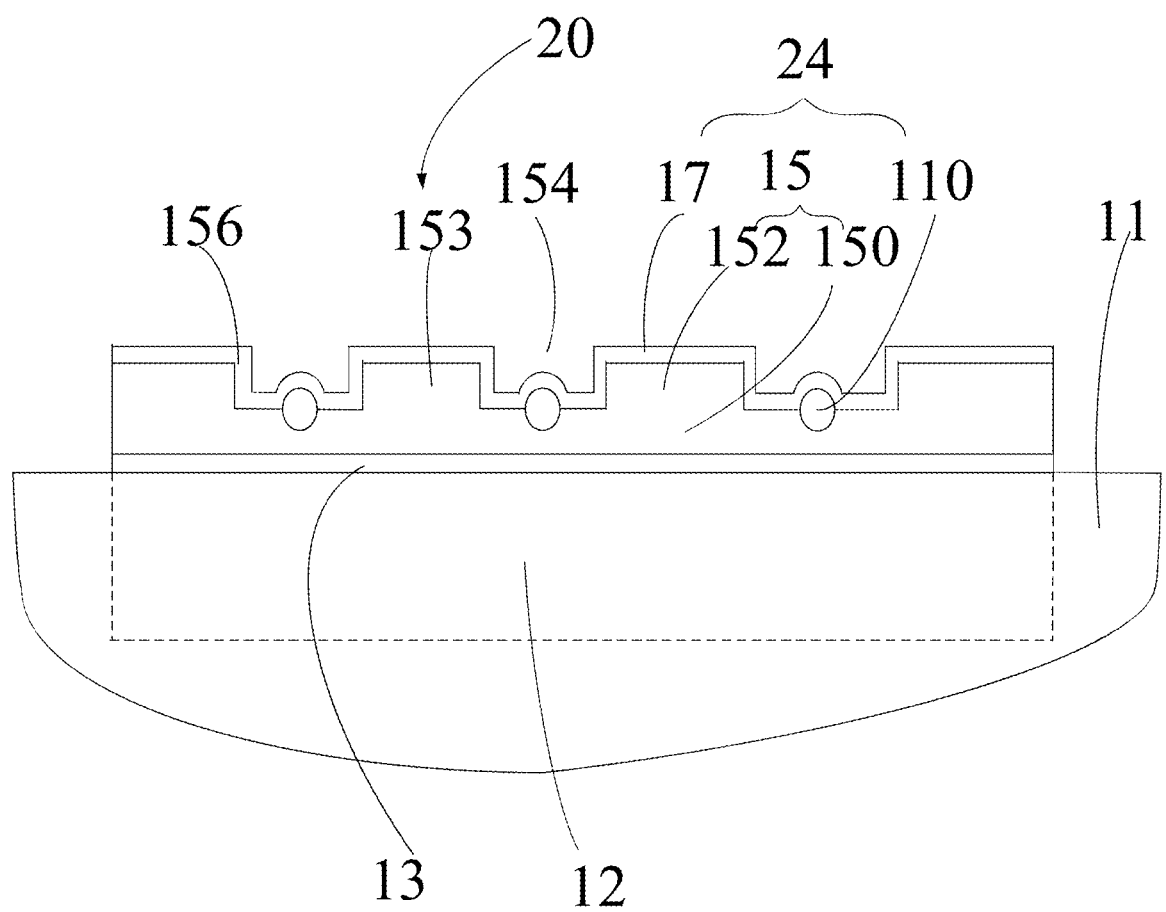
FIG. 15 is a schematic section view of a hydrophobic mirror of another embodiment.

Referring to FIG. 15, a hydrophobic mirror 20 of another embodiment is provided. The hydrophobic mirror 20 comprises a support 11, a mirror body 12 set in the support 11, and a hydrophobic film 24 located on a surface of the mirror body 12. The hydrophobic film 24 comprises a flexible substrate 15, a carbon nanotube structure 110 and a hydrophobic layer 17. The flexible substrate 15 comprises a flexible base 150 and a patterned first bulge layer 152 on the surface of the flexible base 150 away from the mirror body 12. The patterned first bulge layer 152 comprises a plurality of bumps 153 spaced from each other to form a two-dimensional array and define a plurality of first grooves 156. The hydrophobic layer 17 is on the surface of the patterned first bulge layer 152. The carbon nanotube structure 110 is arranged between the bottom surface of the plurality of first grooves 156 and the hydrophobic layer 17.

The hydrophobic mirror 20 is similar to the hydrophobic mirror 10 above except that the hydrophobic film 24 of the hydrophobic mirror 20 further comprises a carbon nanotube structure 110 between the bottom surface of the plurality of first grooves 156 and the hydrophobic layer 17. The carbon nanotube structure 110 can be a pure carbon nanotube structure 111 or a carbon nanotube composite structure 112. In one embodiment, the carbon nanotube structure 110 is a pure carbon nanotube structure 111. The pure carbon nanotube structure 111 reacts with the etching gas during dry etching, but the etching rate is relatively slow. Almost every carbon nanometers of the carbon nanotube structure 110 are partially embedded in the flexible substrate 15 and partially embedded in the hydrophobic layer 17. A patterned second bulge layer 154 is formed at the corresponding position of the carbon nanotube structure 110 on the bottom surface of the plurality of first grooves 156. The carbon nanotube structure 110 between the bottom surface of the plurality of first grooves 156 and the hydrophobic layer 17 can increase the unevenness of the bottom surface of the plurality of first grooves 156, thereby further improving the hydrophobic property of the hydrophobic film 24.

In another embodiment, the patterned first bulge layer 152 comprises a plurality of strip-shaped bulges 155 intersected with each other to form a net-like structure and defines a plurality of first holes 157. The carbon nanotube structure 110 is arranged between the bottom surface of the plurality of first holes 157 and the hydrophobic layer 17. The hydrophobic layer 17 is on the surface of the patterned first bulge layer 152.

Figure 16:
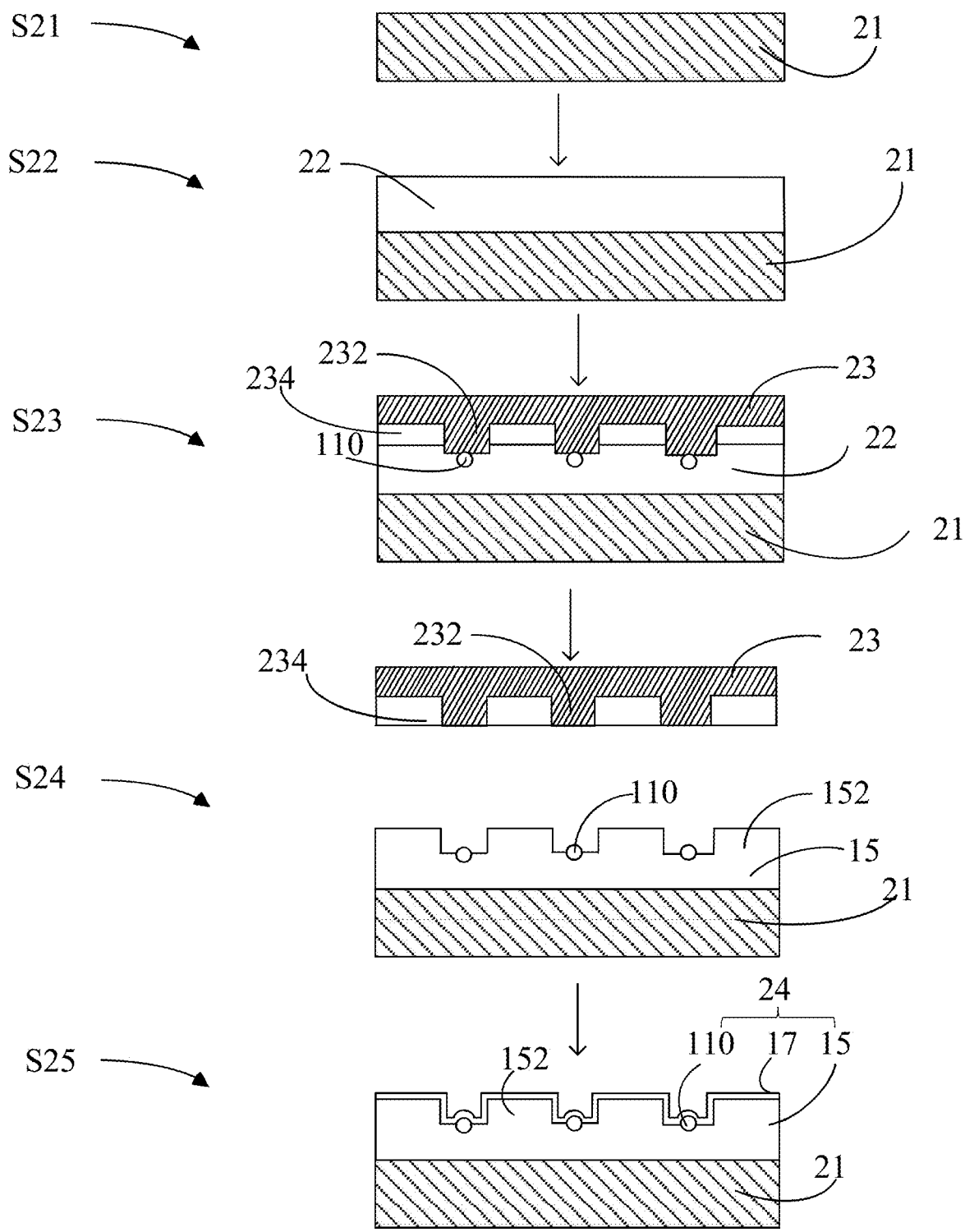
FIG. 16 is a schematic process flowchart of another embodiment of a method for making a hydrophobic film.

Referring to FIG. 16, a method for preparing the hydrophobic film 24 of one embodiment includes the following steps:

(S21), providing a hard substrate 21;

(S22), arranging a polymer layer pre-form 22 on the surface of the hard substrate 21, baking the polymer layer pre-form 22 to make the polymer layer pre-form 22 being semi solid;

(S23), providing a template 23, wherein the template 23 comprises a patterned third bulge layer 232 and a carbon nanotube structure 110 on the top surface of the patterned third bulge layer 232, attaching the surface with a nano-pattern of the template 23 to the polymer layer pre-form 22, then pressing the nano-pattern of the template 23 on to the surface of the polymer layer pre-form 22 to form the patterned first bulge layer 152;

(S24), removing the template 23 to obtain the flexible substrate 15 and leaving the carbon nanotube structure 110 on the surface of the flexible substrate 15;

(S25), applying a hydrophobic layer 17 on the surface of the flexible substrate 15 with the patterned first bulge layer 152.

The method for preparing the hydrophobic film 24 is similar to the method for preparing the hydrophobic film 14 except that the template 23 of this embodiment further comprises a carbon nanotube structure 110 on the top surface of the patterned third bulge layer 232. It is not necessary to remove carbon nanotube structure 110 when preparing template 23.

In one embodiment, the carbon nanotube structure 110 is a pure carbon nanotube structure 111. The pure carbon nanotube structure 111 comprises at least one carbon nanotube film. The carbon nanotube film comprises a plurality of multi-walled carbon nanometers. The plurality of multi-walled carbon nanometers are orderly arranged to form an ordered carbon nanotube structure and define a plurality of apertures. In the process of etching template 23, the multi-walled carbon nanometers are simultaneously etched. The plurality of multi-wall carbon nanometers still exists at the top surface of the patterned third bulge layer 232 of the template 23 by controlling the etching time, and the diameter of each of the plurality of the multi-wall carbon nanometers is less than the width of the strip-shaped bulges in the patterned third bulge layer 232. In other embodiment, the carbon nanotube film comprises a plurality of twisted carbon nanotube wire intersected with each other to form a net-like structure.

Since the state of the polymer layer pre-form 22 is semi-solid and the polymer layer pre-form 22 has viscosity, the binding force between the polymer layer pre-form 22 and the carbon nanotube structure 110 is greater than the binding force between the carbon nanotube structure 110 and the template 23 in the process of pressing the template 23 into the polymer layer pre-form 22. The carbon nanotube structure 110 on the surface of the template 23 is transferred to the surface of the polymer layer pre-form 22. Further more, due to the bonding force between the carbon nanotube structure 110 and the template 23 during the pulling of the template 23, a portion of the carbon nanotube structure 110 in the radial direction is exposed and protrudes from surface of the polymer layer pre-form 22. Thus, the carbon nanotube structure 110 is partially embedded in the flexible substrate 15, and partially embedded in the hydrophobic layer 17.

Figure 17:
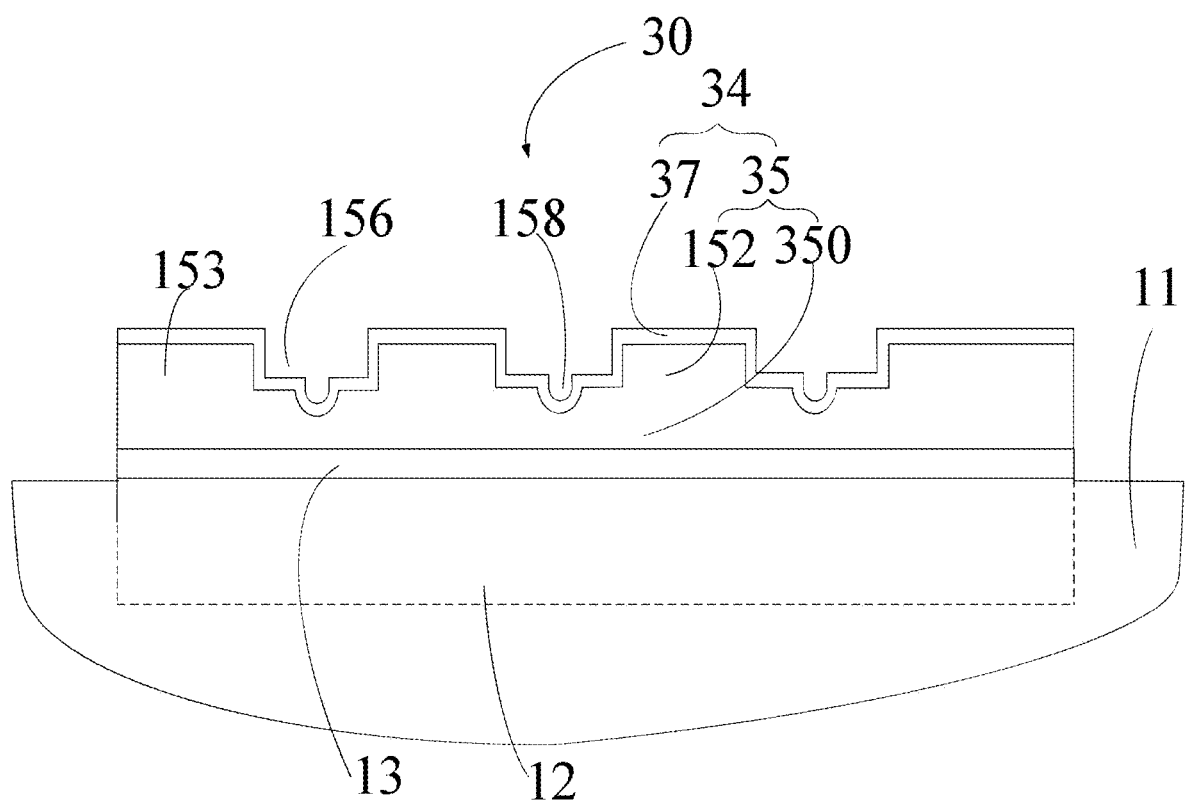
FIG. 17 is a schematic section view of a hydrophobic mirror of another embodiment.

Referring to FIG. 17, a hydrophobic mirror 30 of another embodiment is provided. The hydrophobic mirror 30 comprises a support 11, a mirror body 12 set in the support 11, and a hydrophobic film 34 on a surface of the mirror body 12. The hydrophobic film 34 comprises a flexible substrate 35 and a hydrophobic layer 37 on the surface of the flexible substrate 35. The flexible substrate 35 comprises a flexible base 350 and a patterned first bulge layer 152 located on the surface of the flexible base 350 away from the mirror body 12. The patterned first bulge layer 152 comprises a plurality of bumps 153 spaced from each other to form a two-dimensional array and define a plurality of first grooves 156. The bottom surface of the plurality of first grooves 156 of the hydrophobic film 34 comprises a plurality of second grooves 158. The hydrophobic layer 37 is on the surface of the patterned first bulge layer 152.

The hydrophobic mirror 30 is similar to the hydrophobic mirror 10 above except that the bottom of the plurality of first grooves 156 of the hydrophobic film 34 further comprises a plurality of second grooves 158.

In another embodiment, the patterned first bulge layer 152 comprises a plurality of strip-shaped bulges 155 intersected with each other to form a net-like structure and defines a plurality of first holes 157. The hydrophobic layer 37 is on the surface of the patterned first bulge layer 152. The bottom surface of the plurality of first grooves 156 of the hydrophobic film 34 comprises a plurality of second holes. The hydrophobic layer 37 is on the surface of the patterned first bulge layer 152.

The method for preparing the hydrophobic film 34 is similar to the method for preparing the hydrophobic film 24 except that in the step (S24), the carbon nanotube structure 110 is removed after the template 23 is removed. The method for removing the carbon nanotube structure 110 is not limited, such as ultrasonic method, tearing method, oxidation method and so on.

Figure 18:
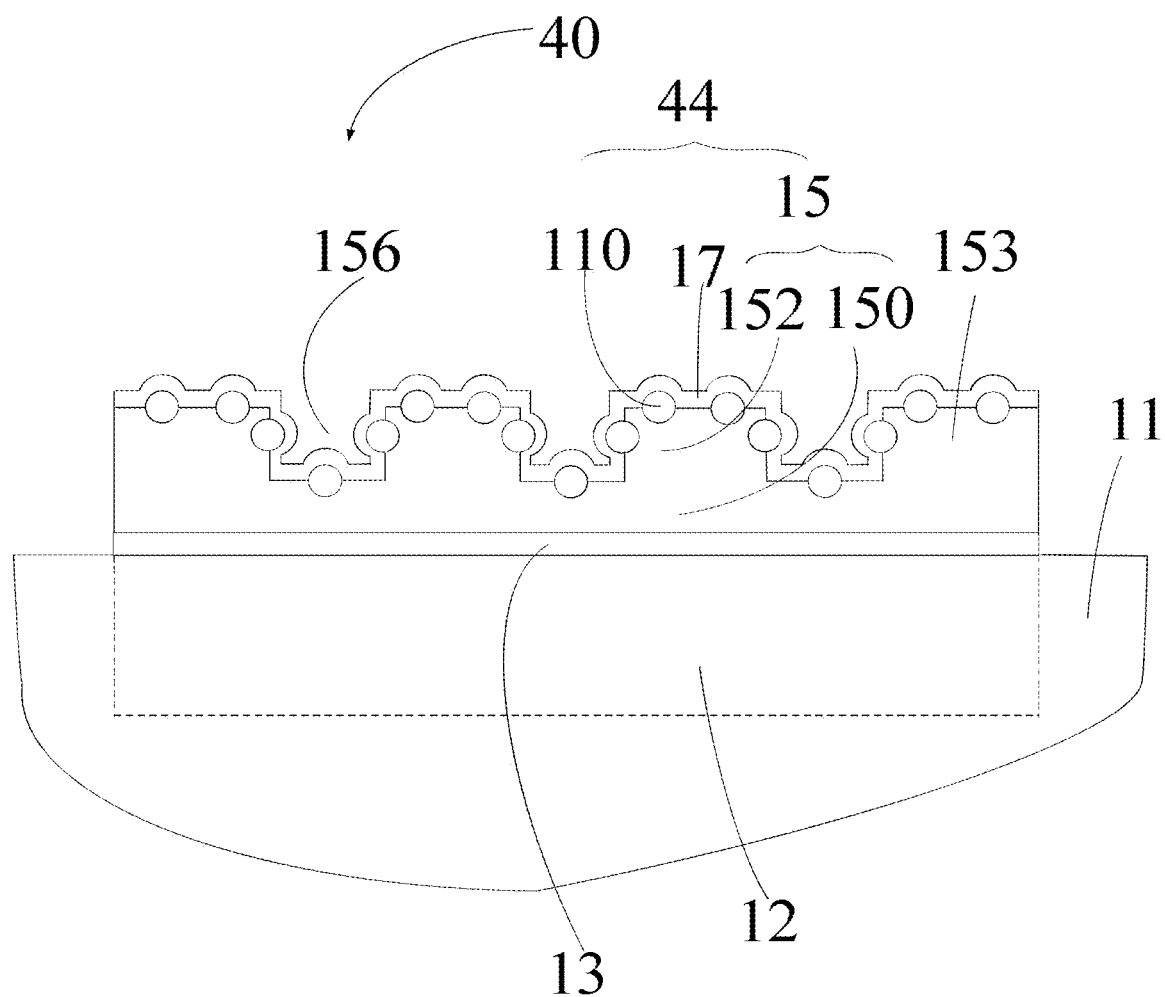
FIG. 18 is a schematic section view of a hydrophobic mirror of another embodiment.

Referring to FIG. 18, a hydrophobic mirror 40 of another embodiment is provided. The hydrophobic mirror 40 comprises a support 11, a mirror body 12 set in the support 11, and a hydrophobic film 44 on a surface of the mirror body 12. The hydrophobic film 44 comprises a flexible substrate 15, a carbon nanotube structure 110 and a hydrophobic layer 17. The flexible substrate 15 comprises a flexible base 150 and a patterned first bulge layer 152 on the surface of the flexible base 150 away from the mirror body 12. The patterned first bulge layer 152 comprises a plurality of bumps 153 spaced from each other to form a two-dimensional array and define a plurality of first grooves 156. The hydrophobic layer 17 is on the surface of the patterned first bulge layer 152. The carbon nanotube structure 110 is arranged between the surface of the patterned first bulge layer 152 and the hydrophobic layer 17.

The hydrophobic mirror 40 is similar to the hydrophobic mirror 20 above except that the hydrophobic film 44 further comprises a carbon nanotube structure 110 between the patterned first bulge layer 152 and the hydrophobic layer 17. The carbon nanotube structure 110 can be a pure carbon nanotube structure 111 or a carbon nanotube composite structure 112. In one embodiment, the carbon nanotube structure 110 is a pure carbon nanotube structure 111. The carbon nanotube structure 110 between the bottom surface of the plurality of first grooves 156, the top surface and the side surface of the patterned first bulge layer 152 and the hydrophobic layer 17 can increase the unevenness of the bottom surface of the plurality of first grooves 156 and the top surface and the side surface of the patterned first bulge layer 152, thereby further improving the hydrophobic property of the hydrophobic film 44.

In another embodiment, the patterned first bulge layer 152 comprises a plurality of strip-shaped bulges 155 intersected with each other to form a net-like structure and defines a plurality of first holes 157. The carbon nanotube structure 110 is arranged between the bottom surface of the plurality of first holes 157, the top surface and the side surface of the patterned first bulge layer 152 and the hydrophobic layer 17. The hydrophobic layer 17 is on the surface of the patterned first bulge layer 152.

Figure 19:
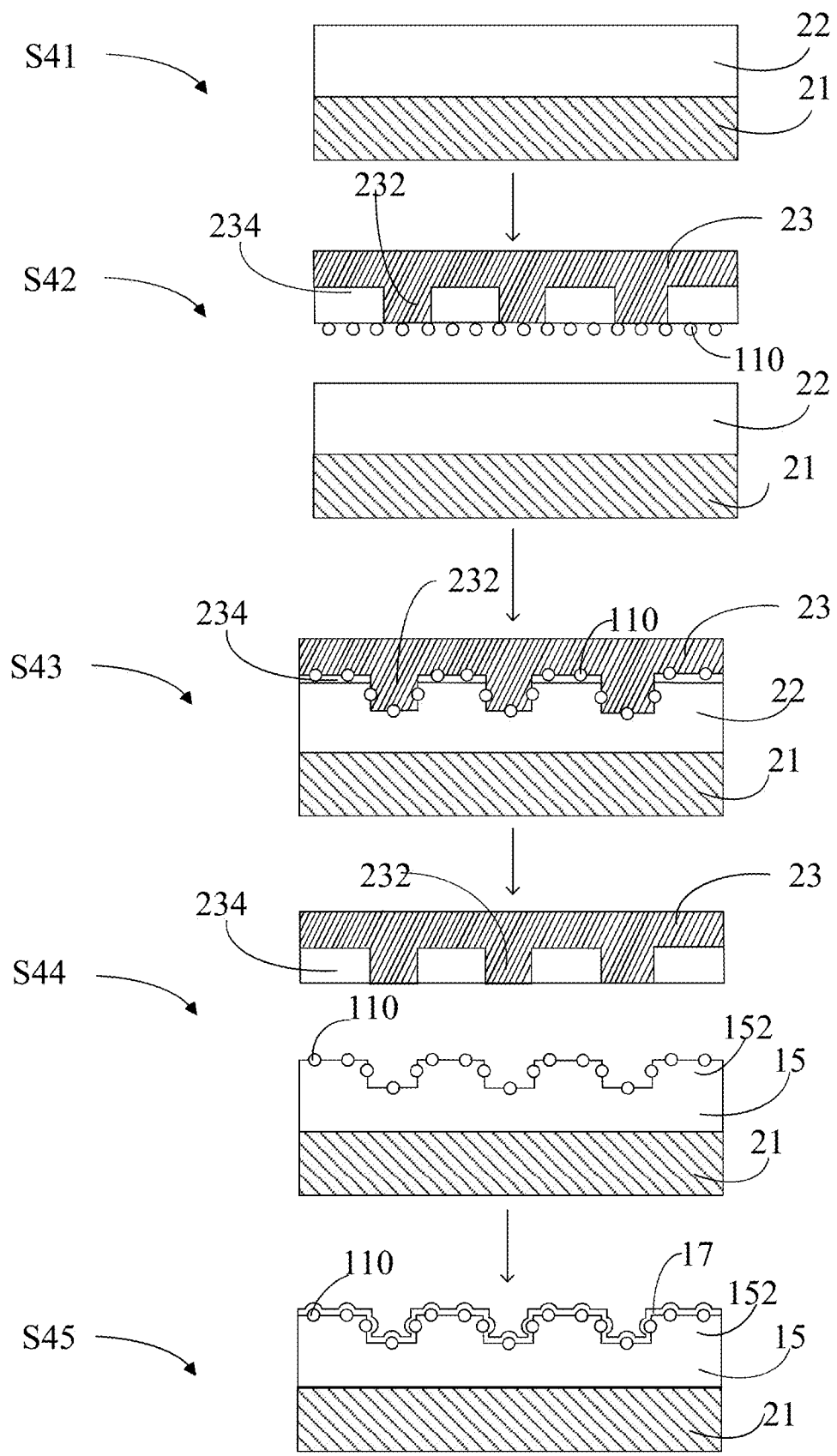
FIG. 19 is a schematic process flowchart of another embodiment of a method for making a hydrophobic film.

Referring to FIG. 19, a method for preparing the hydrophobic film 44 of one embodiment includes the following steps:

(S41), providing a hard substrate 21, (S42), arranging a polymer layer pre-form 22 on the surface of the hard substrate 21, baking the polymer layer pre-form 22 to make the polymer layer pre-form 22 being semi solid;

(S43), providing a template 23, wherein the template 23 comprises a patterned third bulge layer 232 and defines a plurality of third holes 234, placing a carbon nanotube structure 110 on the surface of the patterned third bulge layer 232; and attaching the surface with a nano-pattern of the template 23 to the polymer layer pre-form 22, then pressing the nano-pattern of the template 23 on to the surface of the polymer layer pre-form 22 to form the patterned first bulge layer 152;

(S44), removing the template 23 to obtain the flexible substrate 15 and leaving the carbon nanotube structure 110 on the surface of the flexible substrate 15;

(S45), applying a hydrophobic layer 17 on the surface of the flexible substrate 15 with the patterned first bulge layer 152.

The method for preparing the hydrophobic film 44 is similar to the method for preparing the hydrophobic film 14 except that in the step (S43) further comprises the step of placing a carbon nanotube structure 110 on the surface of the patterned third bulge layer 232. The method for arranging the carbon nanotube structure 110 on the surface of the patterned third bulge layer 232 can be selected according to need. In one embodiment, the step of placing the carbon nanotube structure 110 on the surface of the patterned third bulge layer 232 further comprises a step of solvent treating the template 23 with the carbon nanotube structure 110 thereon. Because there is air between the carbon nanotube structure 110 and the surface of the template 23, the solvent treating can exhaust the air and allow the carbon nanotube structure 110 to be closely and firmly adhered on the surface of the template 23. The solvent treating can be applying a solvent to entire surface of the carbon nanotube structure 110 or immersing the entire template 23 with the carbon nanotube structure 110 in a solvent. The solvent can be water or volatile organic solvent such as ethanol, methanol, acetone, dichloroethane, chloroform, or mixtures thereof. In one embodiment, the organic solvent is ethanol. In other embodiment, the carbon nanotube structure 110 can also be placed on the surface of the polymer layer pre-form 22. Then the template 23 is pressed into the polymer layer pre-form 22.

Figure 20:
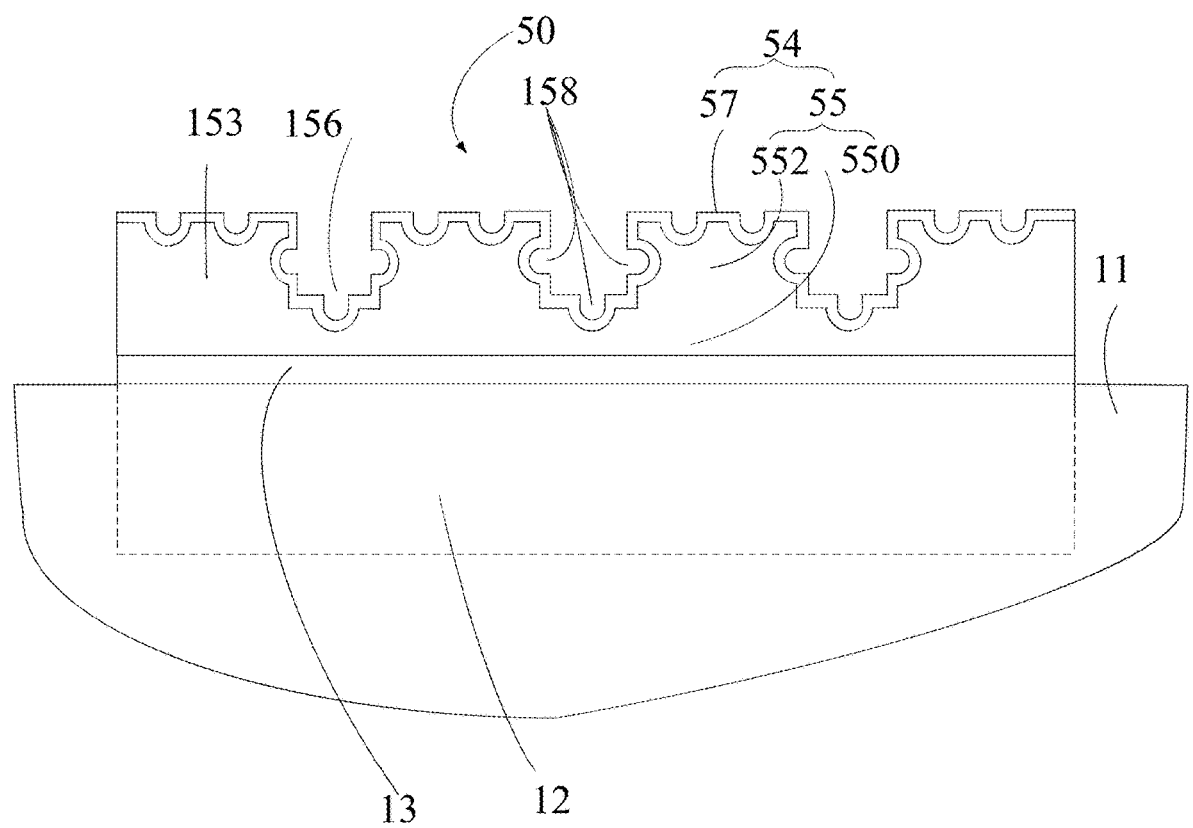
FIG. 20 is a schematic section view of a hydrophobic mirror of another embodiment.

Referring to FIG. 20, a hydrophobic mirror 50 of another embodiment is provided. The hydrophobic mirror 50 comprises a support 11, a mirror body 12 set in the support 11, and a hydrophobic film 54 on a surface of the mirror body 12. The hydrophobic film 54 comprises a flexible substrate 55 and a hydrophobic layer 57 located on the surface of the flexible substrate 55. The flexible substrate 55 comprises a flexible base 550 and a patterned first bulge layer 552 on the surface of the flexible base 550 away from the mirror body 12. The patterned first bulge layer 552 comprises a plurality of bumps 153 spaced from each other to form a two-dimensional array and define a plurality of first grooves 156. The top surface and the side surface of the patterned first bulge layer 552 and the bottom surface of the plurality of the first grooves 156 of the hydrophobic film 54 comprises a plurality of second grooves 158. The hydrophobic layer 57 is located on the surface of the patterned first bulge layer 552.

The hydrophobic mirror 50 is similar to the hydrophobic mirror 10 above except that the top surface and the side surface of the patterned first bulge layer 552 and the bottom surface of the plurality of the first grooves 156 of the hydrophobic film 54 comprises a plurality of second grooves 158.

In another embodiment, the patterned first bulge layer 552 comprises a plurality of strip-shaped bulges 155 intersected with each other to form a net-like structure and defines a plurality of first holes 157. The hydrophobic layer 37 is located on the surface of the patterned first holes 157. The top surface and the side surface of the plurality of first holes 157 of the hydrophobic film 54 comprises a plurality of second holes. The hydrophobic layer 57 is on the surface of the patterned first bulge layer 552.

Figure 21:
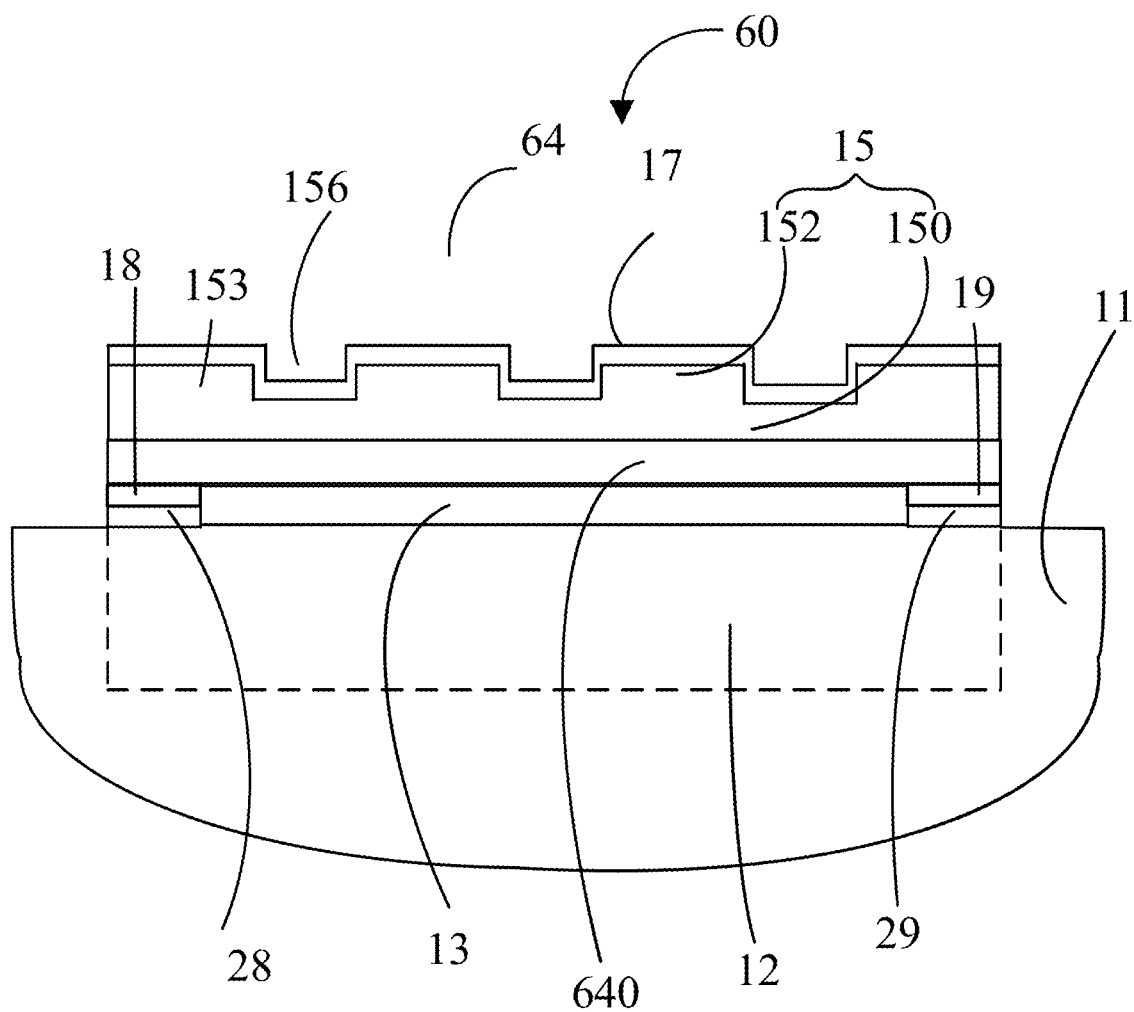
FIG. 21 is a schematic section view of a hydrophobic mirror of another embodiment.

Referring to FIG. 21, a hydrophobic mirror 60 of another embodiment is provided. The hydrophobic mirror 60 comprises a support 11, a mirror body 12 set in the support 11, and a hydrophobic film 64 on a surface of the mirror body 12. The hydrophobic mirror 60 is similar to the hydrophobic mirror 10 above except that the hydrophobic mirror 60 further comprises a third electrode 28 and a fourth electrode 29 spaced apart from each other and both on the mirror body 12. The hydrophobic film 64 further comprises a heating layer 640, a first electrode 18 and a second electrode 19. The heating layer 640 is located on the surface of the flexible substrate 15 away from the hydrophobic layer 17. The first electrode 18 is spaced apart from the second electrode 19 to prevent a short circuit of the electrodes. The first electrode 18 and the second electrode 19 are electrically connected to and in direct contact with the heating layer 640. The first electrode 18 is also electrically connected to and in direct contact with the third electrode 28, and the second electrode 19 is also electrically connected to and in direct contact with the fourth electrode 29. The flexible substrate 15 and the hydrophobic layer 17 should have good thermal conductivity. The heating layer 640 can be a transparent conductive layer and can be made of indium tin oxide (ITO), carbon nanotubes and so on. In one embodiment, the heating layer 640 is a carbon nanotube film.

The first electrode 18, the second electrode 19, the third electrode 28, and the fourth electrode 29 should have good conductive properties. The first electrode 18, the second electrode 19, the third electrode 28, and the fourth electrode 29 can be conductive films, metal sheets, or metal lines, and can be made of pure metals, metal alloys, indium tin oxide (ITO), antimony tin oxide (ATO), silver paste, conductive polymer, and metallic carbon nanotubes, and combinations thereof. The pure metals and metal alloys can be aluminum, copper, tungsten, molybdenum, gold, titanium, neodymium, cesium, palladium, or combinations thereof. The shape of the first electrode 18 or the second electrode 19 is not limited and can be for example, lamellar, rod, wire, or block shaped. In the embodiment, the first electrode 18, the second electrode 19, the third electrode 28, and the fourth electrode 29 are made of ITO, and are all transparent.

The first electrode 18 and the second electrode 19 can be electrically attached to and fixed on the heating layer 640 by a conductive adhesive (not shown), such as silver adhesive. In some embodiments, the first electrode 18 and the second electrode 19 can be adhered directly to the heating layer 640 because carbon nanotube films have a large specific surface area and are adhesive in nature. The third electrode 28, and the fourth electrode 29 are fixed on the mirror body 12. After the hydrophobic film 64 is removed from the mirror body 12, the first electrode 18 and the second electrode 19 are separated from the third electrode 28, and the fourth electrode 29. The third electrode 28 and the fourth electrode 29 are retained on the surface of the mirror body 12.

In use, the third electrode 28 and the fourth electrode 29 are electrically connected to a power source. The power source can be a battery located in a space defined by the support 11. The first electrode 18 is electrically connected to and in direct contact with the third electrode 28, and the second electrode 19 is electrically connected to and in direct contact with the fourth electrode 29. Therefore, the carbon nanotube films have a current passing through and generate heat. Then, the heat is transmitted to the hydrophobic layer 17. The water on the surface of the hydrophobic layer 17 will evaporate. Since the carbon nanotube films have good electrical conductivity, thermal stability and high efficiency of electro-thermal conversion, the hydrophobic film 64 have a high efficiency of electro-thermal conversion.

The hydrophobic mirror 60 can be applied to automobile mirror. Rain drops on the mirror may affect the drivers in rainy days. The use of the hydrophobic mirror 60 can prevent the rain gathering by evaporating the raindrops on the mirror quickly.

Figure 22:
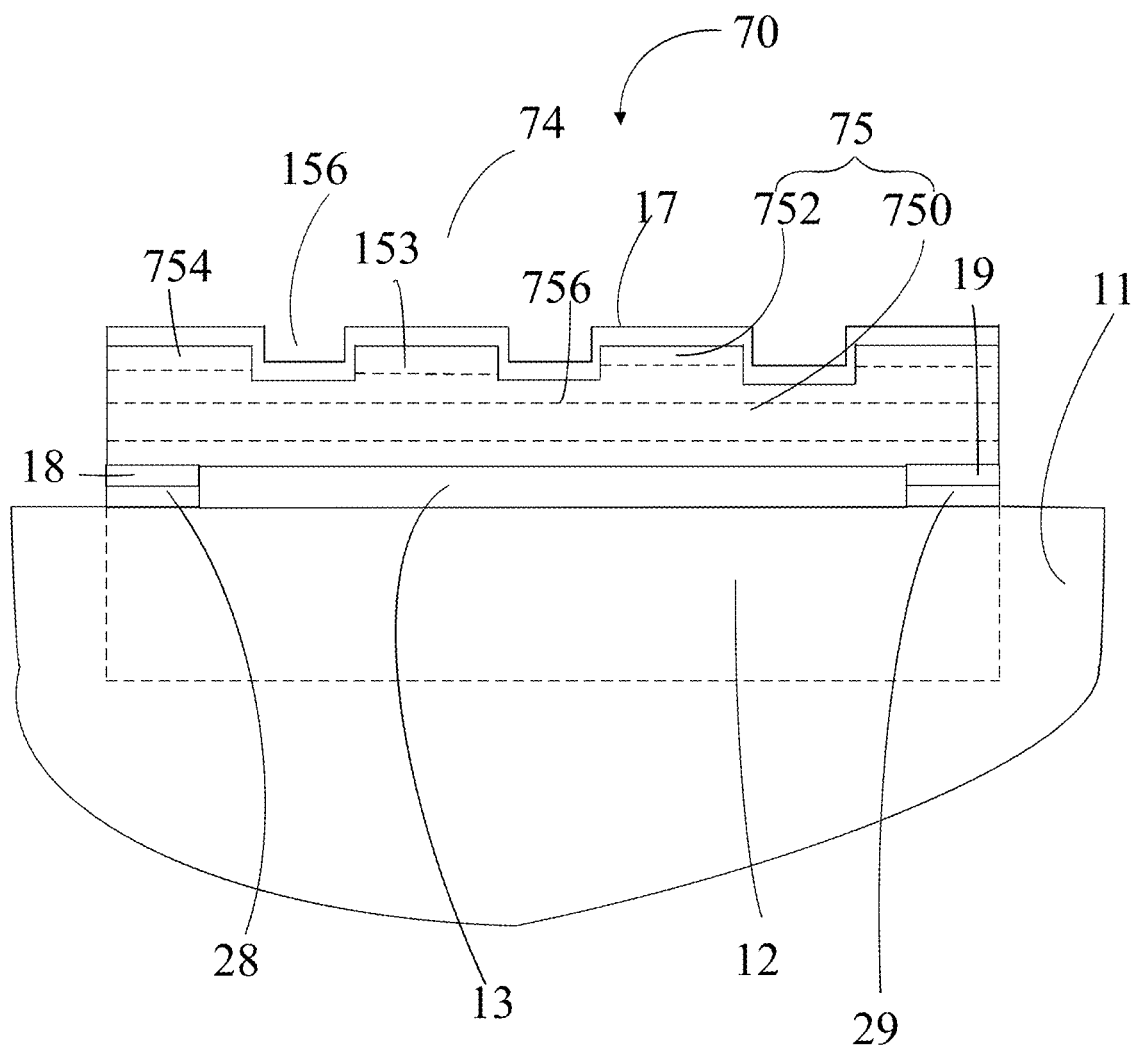
FIG. 22 is a schematic section view of a hydrophobic mirror of another embodiment.

Referring to FIG. 22, a hydrophobic mirror 70 of another embodiment is provided. The hydrophobic mirror 70 comprises a support 11, a mirror body 12 set in the support 11, and a hydrophobic film 74 on a surface of the mirror body 12. The hydrophobic mirror 70 further comprises a third electrode 28 and a fourth electrode 29 spaced apart from each other and both on the mirror body 12. The hydrophobic film 74 comprises a flexible substrate 75, a hydrophobic layer 17, a first electrode 18 and a second electrode 19. The hydrophobic layer 17 is on a surface of the flexible substrate 75. The flexible substrate 75 comprises a flexible base 750 and a patterned first bulge layer 752 on a surface of the flexible base 750. The patterned first bulge layer 752 comprises a plurality of bumps 153 spaced from each other to form a two-dimensional array and define a plurality of first grooves 156. The hydrophobic layer 17 is on the surface of the patterned first bulge layer 752. The flexible substrate 75 has electrical and thermal conductivity. The first electrode 18 and the second electrode 19 are spaced apart from each other and both located on the surface of the flexible substrate 75 away from the hydrophobic layer 17. The hydrophobic film 74 also comprises an adhesive layer 13 on the surface of the flexible substrate 75 away from the hydrophobic layer 17 and a shielded layer 130 on the surface of the adhesive layer 13 away from the flexible substrate 75. The first electrode 18 and the second electrode 19 are both electrically connected to and in direct contact with the flexible substrate 75. The first electrode 18 is also electrically connected to and in direct contact with the third electrode 28, and the second electrode 19 is also electrically connected to and in direct contact with the fourth electrode 29.

Figure 23:
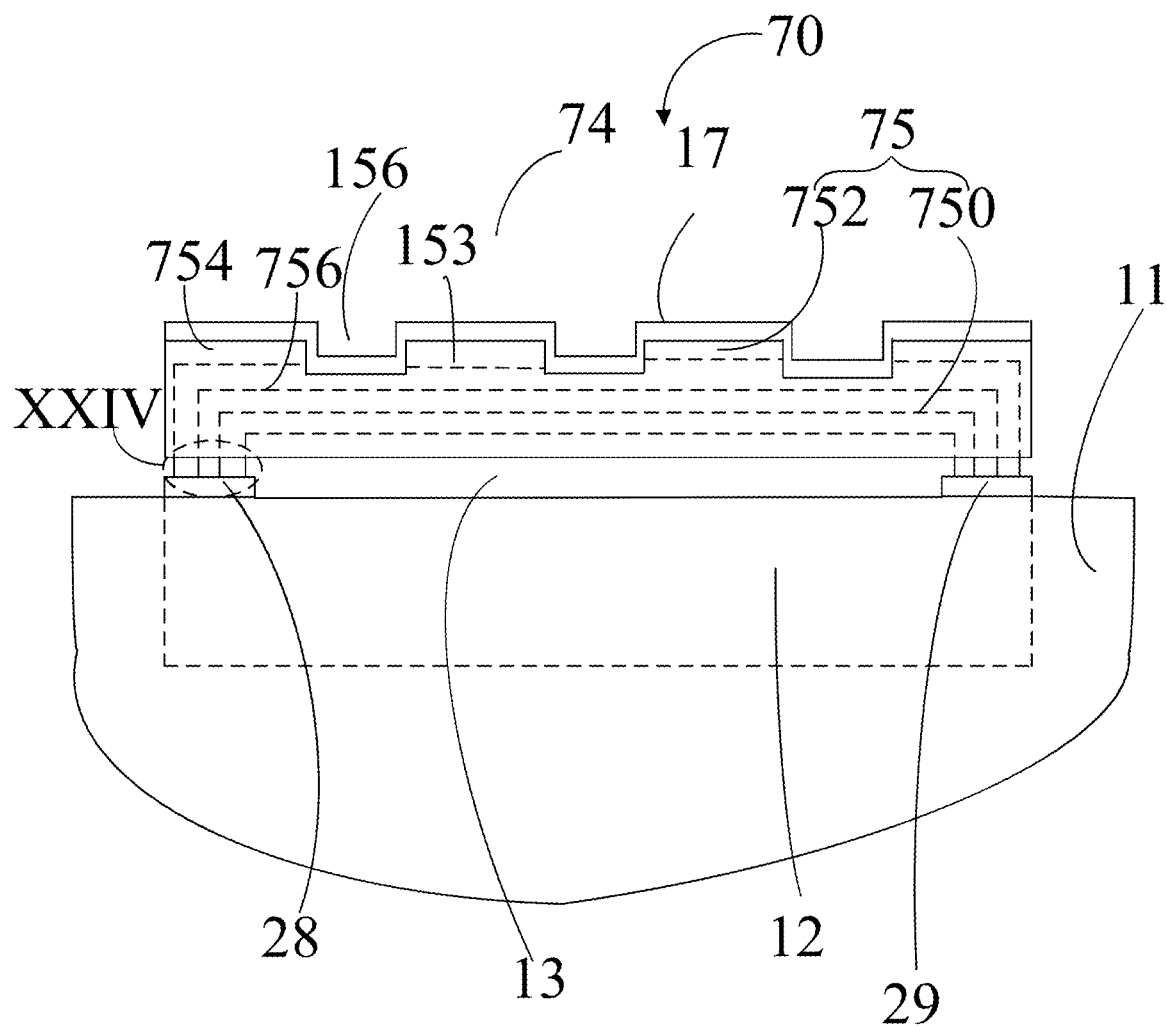
FIG. 23 is a schematic section view of a hydrophobic mirror of another embodiment.
Figure 24:
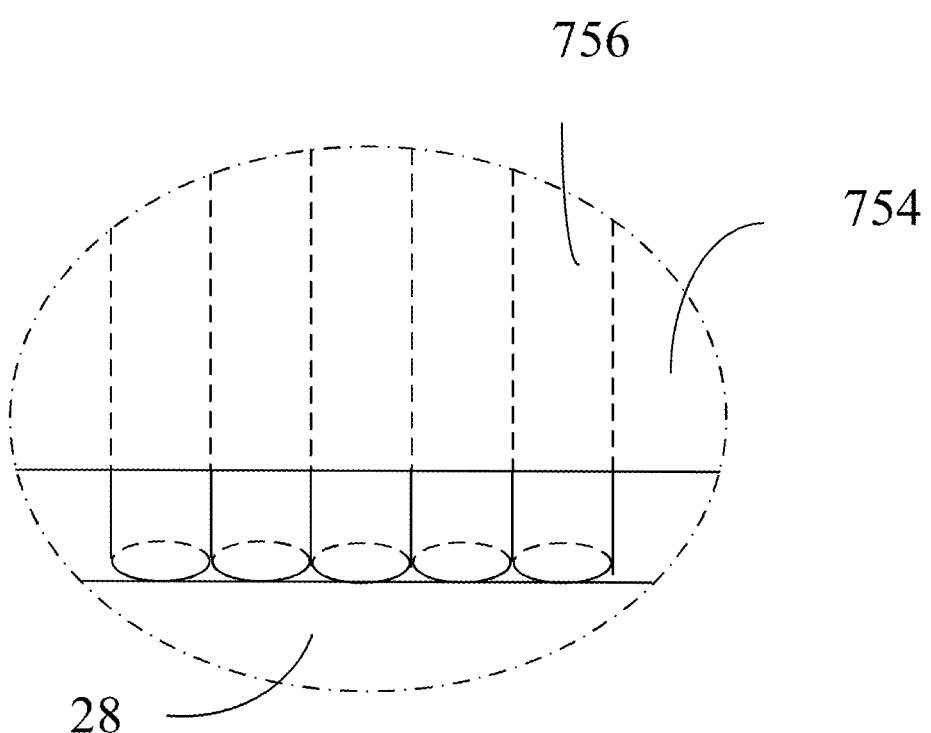
FIG. 24 is a partially enlarged view of circle XXIV of FIG. 23.

The hydrophobic mirror 70 is similar to the hydrophobic mirror 60 above expect that the flexible substrate 75 of the hydrophobic film 74 has electrical and thermal conductivity without the heating layer 640. In one embodiment, the flexible substrate 75 comprises a polymer matrix 754 and a carbon nanotube structure 756 dispersed therein. The carbon nanotube structure 756 comprises a plurality of carbon nanotubes oriented along preferred orientations in one or several directions. In one embodiment, referring to FIG. 23, some of the plurality of carbon nanotubes are exposed from the polymer matrix 754 and in direct contact with the third electrode 28 and the fourth electrode 29. "Some" means that the ends of the plurality of carbon nanotubes along the length direction are exposed from the polymer matrix 754. The exposed carbon nanotubes are made by bending the ends of the carbon nanotubes which are oriented along preferred orientations in one direction. The exposed carbon nanotubes act as the first electrode 18 and the second electrode 19. Referring to FIG. 24, each carbon nanotube (CNT) has one end protruding out of the polymer matrix 754 to form the first electrode 18.

Figure 25:
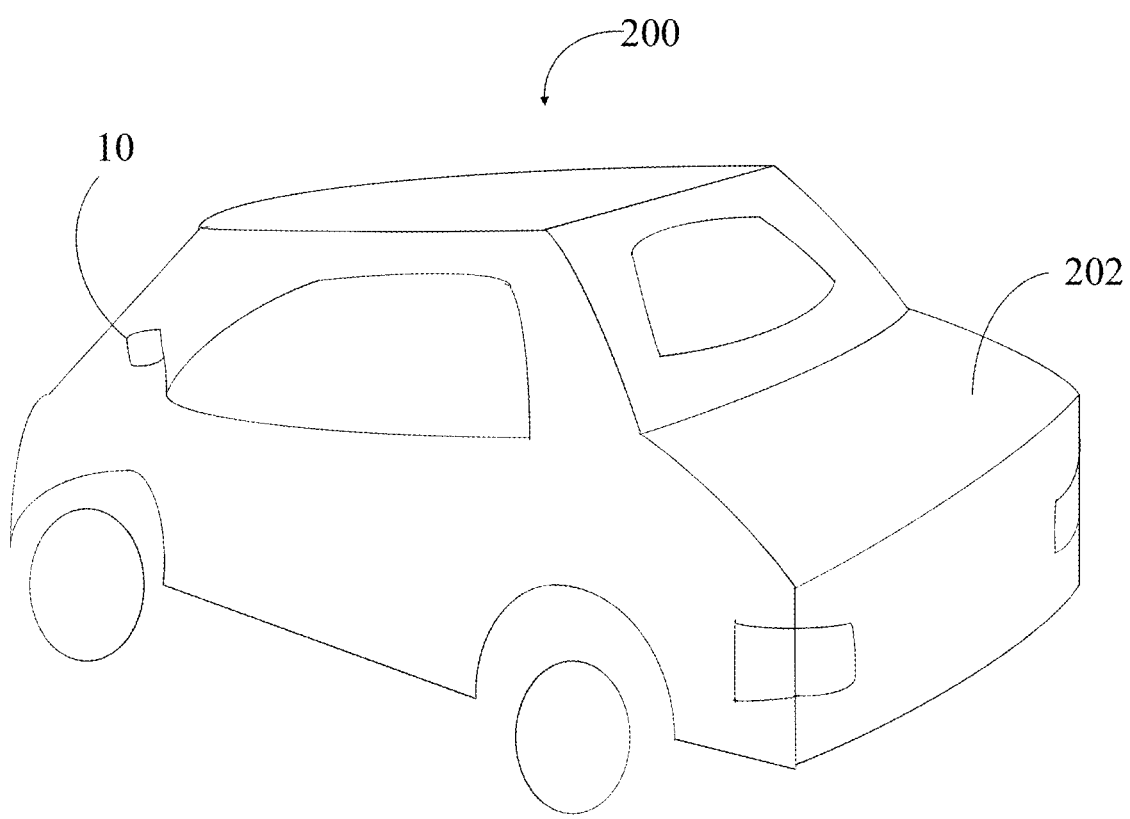
FIG. 25 is a schematic view of a vehicle using the hydrophobic mirror of FIG. 1.

Referring to FIG. 25, a vehicle 200 using the hydrophobic mirror 10 of another embodiment is provided. The vehicle 200 comprises a vehicle body 202 and the hydrophobic mirror 10 set in the vehicle body 102.

The application of the hydrophobic mirror is not limited to vehicles. The hydrophobic mirror can be used in other applications such as building mirrors or other surfaces wherein hydrophobicity is needed.

The hydrophobic film made by the method as disclosed has the following characters. Firstly, the flexible substrate is a flexible transparent film to make the hydrophobic film have flexibility, so that the hydrophobic film can be attached to a curved surface. Secondly, the hydrophobic property of the hydrophobic will be outstandingly enhanced for the reason that the width and distance of the plurality of strip-shaped bulges are tens of nanometers. Thirdly, the hydrophobic film can also generate heat by electrifying to eliminate ice, frost and rain.

The above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A hydrophobic mirror, the hydrophobic mirror comprising:
   a support;
   a mirror body set in the support;
   a third electrode and a fourth electrode located on the mirror body and spaced apart from each other; and
   a hydrophobic film on a surface of the mirror body, wherein the hydrophobic film comprises:
     a flexible substrate, wherein the flexible substrate comprises a flexible base and a patterned first bulge layer on a surface of the flexible base;
     a hydrophobic layer on a surface of the patterned first bulge layer opposite to the flexible base;
     a heating layer on a surface of the flexible substrate away from the hydrophobic layer; and
     a first electrode and a second electrode spaced apart from the first electrode, wherein the first electrode and the second electrode are electrically connected to and in direct contact with the heating layer; and the first electrode is electrically connected to and in direct contact with the third electrode, and the second electrode is electrically connected to and in direct contact with the fourth electrode.

2. The hydrophobic mirror of claim 1, wherein the patterned first bulge layer is a net-like structure comprising a plurality of strip-shaped bulges intersected with each other and a plurality of first holes are defined between the plurality of strip-shaped bulges.

3. The hydrophobic mirror of claim 2, wherein the plurality of strip-shaped bulges comprises a plurality of first strip-shaped bulges and a plurality of second strip-shaped bulges, the plurality of first strip-shaped bulges are substantially parallel with each other and extend along a first direction, and the plurality of second strip-shaped bulges are substantially parallel with each other and extend along a second direction different from the first direction.

4. The hydrophobic mirror of claim 3, wherein an angle between the first direction and the second direction is greater than 30 degrees and less than or equal to 90 degrees.

5. The hydrophobic mirror of claim 2, wherein each of the plurality of strip-shaped bulges has a width ranging from about 25 nanometers to about 600 nanometers and a height ranging from about 75 nanometers to about 800 nanometers, and a distance between adjacent two of the plurality of strip-shaped bulges ranges from about 15 nanometers to about 800 nanometers.

6. The hydrophobic mirror of claim 2, wherein the hydrophobic film further comprises a carbon nanotube structure between the flexible substrate and the hydrophobic layer, and the carbon nanotube structure is arranged on bottom surfaces of the first holes.

7. The hydrophobic mirror of claim 1, wherein the hydrophobic film further comprises a carbon nanotube structure between the flexible substrate and the hydrophobic layer, and the carbon nanotube structure is arranged on top surfaces and side surfaces of the patterned first bulge layer.

8. The hydrophobic film of claim 1, wherein the patterned first bulge layer comprises a plurality of bumps spaced apart from each other forming a two-dimensional layer of arrays and a plurality of first grooves defined between the plurality of bumps.

9. The hydrophobic mirror of claim 8, wherein the hydrophobic film further comprises a carbon nanotube structure between the flexible substrate and the hydrophobic layer, and the carbon nanotube structure is arranged on bottom surfaces of the first grooves.

10. The hydrophobic mirror of claim 1, wherein the flexible base and the patterned first bulge layer are an integrated structure, and a material of the flexible base and the patterned first bulge layer is an insulating material or a semiconductor material.

11. The hydrophobic mirror of claim 1, wherein hydrophobic film further comprises an adhesive layer between the flexible substrate and the mirror body.

12. The hydrophobic mirror of claim 1, wherein the heating layer comprises an indium tin oxide layer or a carbon nanotube layer.

13. A vehicle comprising, a vehicle body, and a hydrophobic mirror set in the vehicle body, wherein the hydrophobic mirror comprises:
    a support;
    a mirror body set in the support;
    a third electrode and a fourth electrode located on the mirror body and spaced apart from each other; and
    a hydrophobic film on a surface of the mirror body, wherein the hydrophobic film comprises:
      a flexible substrate, wherein the flexible substrate comprises a flexible base and a patterned first bulge layer on a surface of the flexible base;
      a hydrophobic layer on a surface of the patterned first bulge layer opposite to the flexible base;
      a heating layer on a surface of the flexible substrate away from the hydrophobic layer; and
      a first electrode and a second electrode spaced apart from the first electrode, wherein the first electrode and the second electrode are electrically connected to and in direct contact with the heating layer; and the first electrode is electrically connected to and in direct contact with the third electrode, and the second electrode is electrically connected to and in direct contact with the fourth electrode.

14. The vehicle of claim 13, wherein the patterned first bulge layer is a net-like structure comprising a plurality of strip-shaped bulges intersected with each other and a plurality of first holes are defined between the plurality of strip-shaped bulges.

15. The vehicle of claim 13, wherein the patterned first bulge layer comprises a plurality of bumps spaced apart from each other forming a two-dimensional layer of arrays and a plurality of first grooves defined between the plurality of bumps.

16. A hydrophobic mirror, the hydrophobic mirror comprising:
   a support;
   a mirror body set in the support;
   a third electrode and a fourth electrode located on the mirror body and spaced apart from each other; and
   a hydrophobic film on a surface of the mirror body, wherein the hydrophobic film comprises:
      a flexible substrate, wherein the flexible substrate comprises a flexible base and a patterned first bulge layer on a surface of the flexible base, and the flexible substrate is electrically and thermally conductive;
      a hydrophobic layer on a surface of the patterned first bulge layer opposite to the flexible base; and
      a first electrode and a second electrode spaced apart from the first electrode, wherein the first electrode and the second electrode are electrically connected to and in direct contact with the flexible substrate; and the first electrode is electrically connected to and in direct contact with the third electrode, and the second electrode is electrically connected to and in direct contact with the fourth electrode.

17. The hydrophobic mirror of claim 16, wherein the flexible substrate comprises a polymer matrix and a carbon nanotube structure dispersed therein.

* * * * *